(12) United States Patent
Jaber

(10) Patent No.: US 7,533,140 B2
(45) Date of Patent: May 12, 2009

(54) METHOD AND APPARATUS FOR ENHANCING PROCESSING SPEED FOR PERFORMING A LEAST MEAN SQUARE OPERATION BY PARALLEL PROCESSING

(75) Inventor: Marwan Jaber, Montreal (CA)

(73) Assignee: Jaber Associates, L.L.C., Wilmington, DE (US)

( * ) Notice: Subject to any disclaimer, the term of this patent is extended or adjusted under 35 U.S.C. 154(b) by 561 days.

(21) Appl. No.: 11/104,988

(22) Filed: Apr. 13, 2005

(65) Prior Publication Data

US 2006/0041403 A1    Feb. 23, 2006

Related U.S. Application Data

(60) Provisional application No. 60/561,956, filed on Apr. 13, 2004.

(51) Int. Cl.
*G06F 17/10* (2006.01)

(52) U.S. Cl. ...................................... 708/322

(58) Field of Classification Search .................. 708/322
See application file for complete search history.

(56) References Cited

U.S. PATENT DOCUMENTS

| 5,535,150 | A | * | 7/1996 | Chiang | 708/322 |
| 5,689,528 | A | * | 11/1997 | Tsujimoto | 375/233 |
| 5,781,063 | A | * | 7/1998 | Kub et al. | 327/552 |
| 6,009,448 | A | * | 12/1999 | Jong et al. | 708/322 |
| 7,167,883 | B2 | * | 1/2007 | Greiss et al. | 708/319 |

* cited by examiner

*Primary Examiner*—David H Malzahn
(74) *Attorney, Agent, or Firm*—Volpe and Koenig P.C.

(57) ABSTRACT

The present invention is related to a method and apparatus for enhancing processing speed for performing a least mean square operation by parallel processing. The input data are subdivided into a plurality of groups and processed by a plurality of adaptive filters in parallel. A Jaber product device is utilized for rearranging the processing results. A subtractor subtracts the output from the Jaber product device from a desired result to generate an error signal. A feedback network adjusts the adaptive filters in accordance with the error signal.

12 Claims, 23 Drawing Sheets

METHOD AND APPARATUS FOR ENHANCING PROCESSING SPEED FOR PERFORMING A LEAST MEAN SQUARE OPERATION BY PARALLEL PROCESSING

CROSS REFERENCE TO RELATED APPLICATION

This application claims the benefit of U.S. Provisional Application No. 60/561,956, filed Apr. 13, 2004 which is incorporated by reference as if fully set forth.

FIELD OF INVENTION

The present invention is related to a method and apparatus for enhancing processing speed for performing a least-mean square operation by parallel processing.

BACKGROUND

Enormous computational load is one of the problems in modern signal processing applications. In order to solve the computational load problem, hardware organization techniques for exploiting parallelism have been developed. Parallel computing is performed by utilizing multiple concurrent processes in the fulfillment of a common task. These processes may be executed on different processors of a multi-processor computer in parallel. Massive parallel processors may even employ thousands of processors which are connected by very fast interconnection networks.

The least-mean square (LMS) algorithm is a linear adaptive filtering algorithm that consists of two basic processes: 1) a filtering process, which involves computing the output of a transversal filter by a set of tap inputs and generating an estimation error by comparing this output to a desired response; and 2) an adaptive process, which involves an automatic adjustment of the tap weights of the filter in accordance with the estimation error. FIG. 3 shows an adaptive filter in which the LSM algorithm has been implemented on parallel processors. However, this introduces a problem in that the rest of operations should be done sequentially.

SUMMARY

The present invention is related to a method and apparatus for enhancing processing speed for performing a least mean square operation by parallel processing. The input data are subdivided into a plurality of groups and processed by a plurality of adaptive filters in parallel. A Jaber product device is utilized for rearranging the processing results. A subtractor subtracts the output from the Jaber product device from a desired result to generate an error signal. A feedback network adjusts the adaptive filters in accordance with the error signal.

DETAILED DESCRIPTION OF THE PREFERRED EMBODIMENTS

Figure 1:
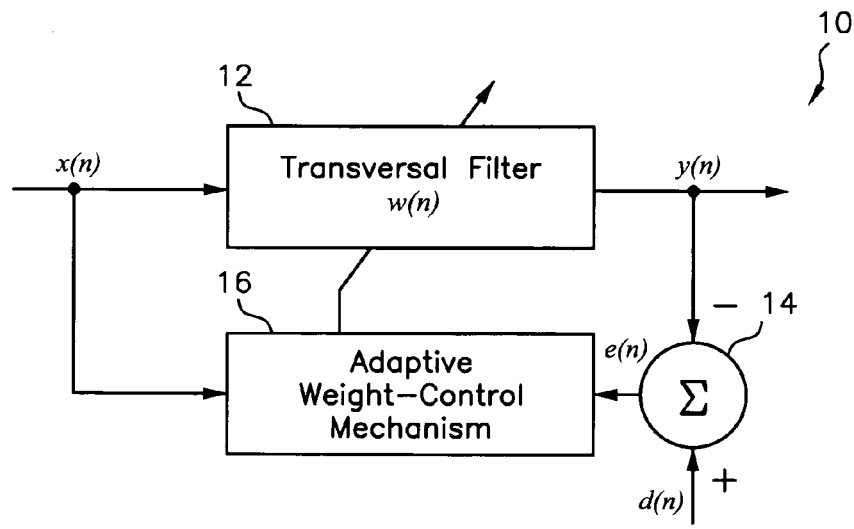
FIG. 1 is a block diagram of an adaptive transversal filter.

FIG. 1 is a block diagram of an adaptive transversal filter 10 including a transversal filter 12, a summer 14 and an adaptive weight control mechanism 16. The combination of these two processes constitutes a feedback loop around the LMS algorithm, implemented within the transversal filter 12.

Figure 2:
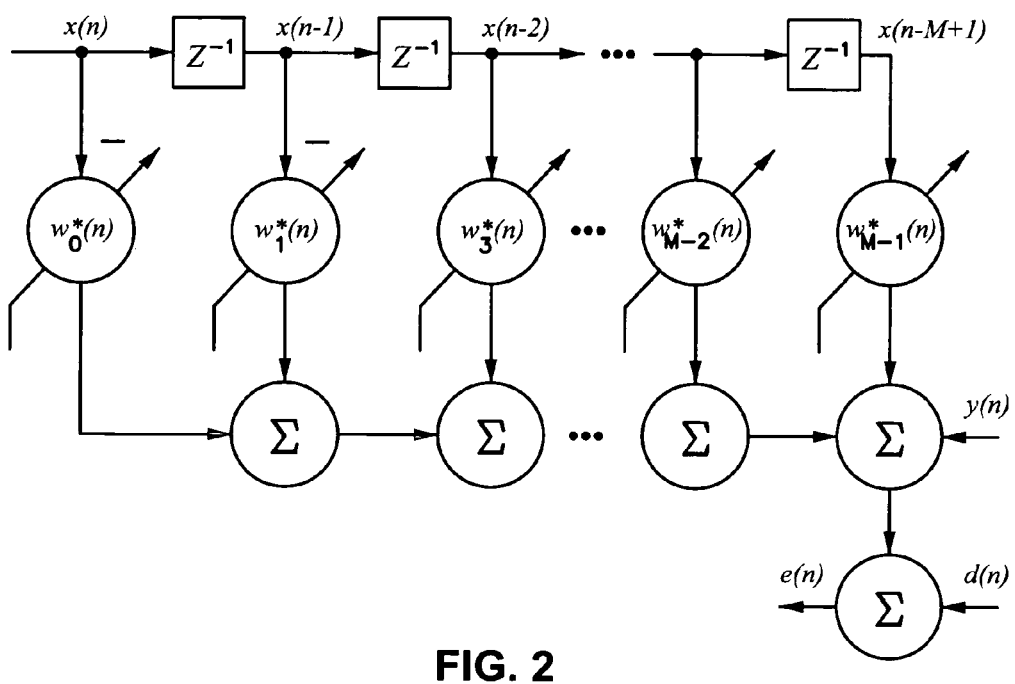
FIG. 2 is a detailed block diagram of the transversal filter of FIG. 1.

FIG. 2 is a detailed block diagram of the transversal filter 12 of FIG. 1. The tap inputs x(n), x(n−1), ..., x(n−M+1) from the elements of the of the M-by-1 tap input vector x(n), (where M−1 is the number of delay elements), span a multi-dimensional space X(n). The value computed for the tap-weight vector w(n) using the LMS algorithm represents an estimate whose expected value approaches the Wiener solution $w_0$ (for a wide-sense stationary environment) as the number of iterations n approaches infinity.

During the filtering process, the desired response d(n) is supplied for processing alongside the tap-input vector x(n). Given this input, the transversal filter-12 produces an output $y_{(n)}$ used as an estimate of the desired response d(n). Accordingly, an estimation error e(n) is defined as a difference between the desired response and the actual filter output, as indicated in the output end of FIG. 2. The estimation error e(n) and the tap-input vector x(n) are applied to the adaptive weight control mechanism 16.

Figure 3:
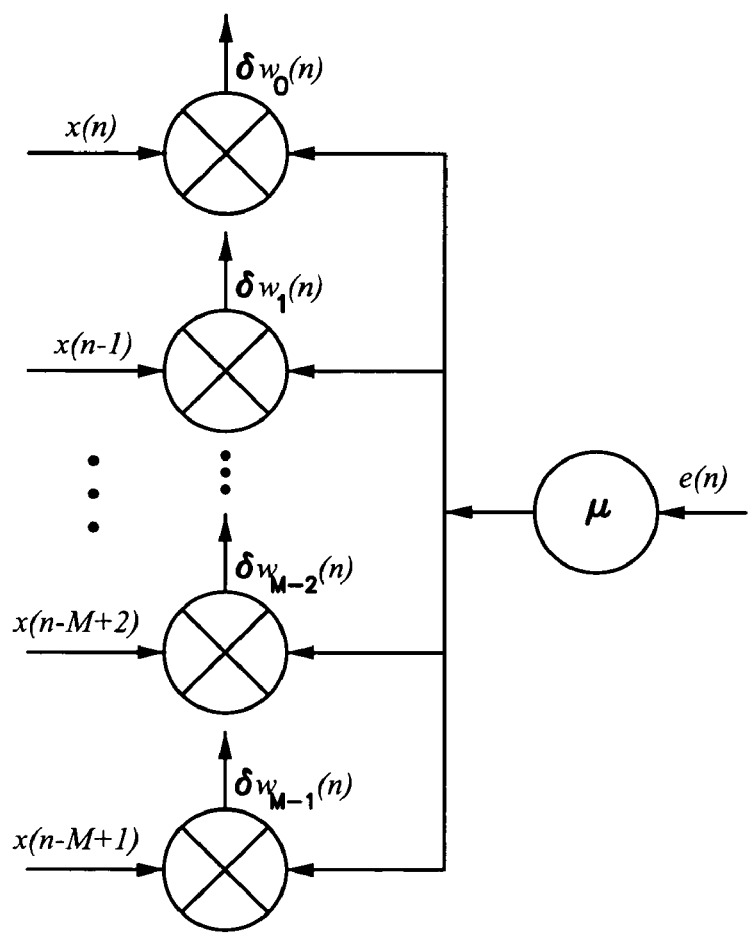
FIG. 3 is a detailed block diagram of an adaptive weight control mechanism.

FIG. 3 is a diagram of detailed structure of the adaptive weight control mechanism 16. A scalar version of the inner product of the estimation error e(n) and the tap input vector x(n−k) is computed for k=0, 1, ..., M−2, M−1. The result so obtained defines the correction $\delta w_k(n)$ applied to the tap weight $w_k(n)$ at iteration n+1. The scaling factor used in this computation is denoted by μ which is called a step-size parameter.

Adaptive systems are those who change their parameters (through algorithms) in order to meet a pre-specified function, which is either an input-output map or an internal constraint. There are basically two ways to adapt the system parameters: 1) supervised adaptation when there is a desired response that can be used by the system to guide the adaptation; and 2) unsupervised learning when the system parameters are adapted using only the information of the input and are constrained by pre-specified internal rules.

Figure 4:
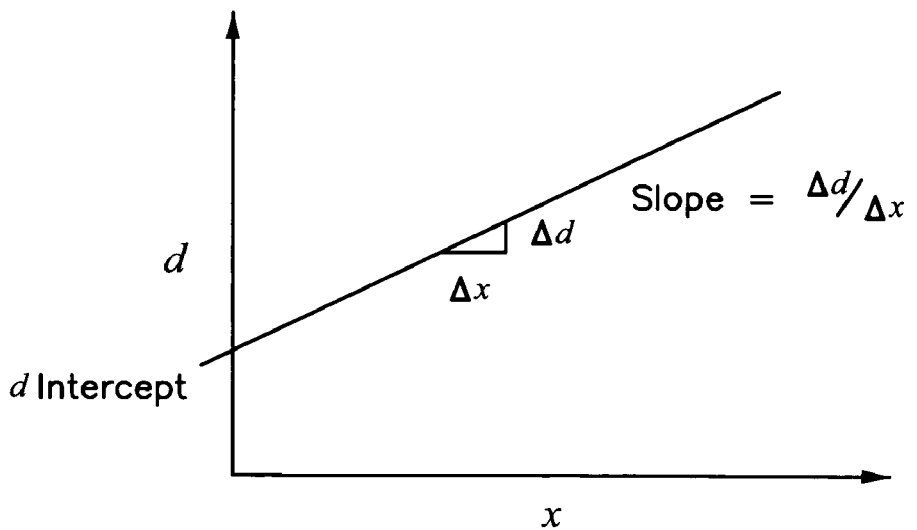
FIG. 4 is a diagram of linear regression.

Regression models are used to predict one variable from one or more other variables. Regression models provide a powerful tool, allowing predictions about past, present, or future events to be made with information about past or present events. Linear regression analyzes the relationship between two variables, x and d. The slope and/or intercept have a scientific meaning, and the linear regression line is used as a standard curve to find new values of x from d, or d from x. The goal of linear regression is to adjust the values of slope and intercept to find the line that best predicts d from x. More precisely, the goal of regression is to minimize the sum of the squares of the vertical distances of the points from the line. FIG. 4 is a diagram of a linear regression result. The slope quantifies the steepness of the line. It equals the change in d for each unit change in x. It is expressed in the units of the d-axis divided by the units of the x-axis. If the slope is positive, d increases as x increases. If the slope is negative, d decreases as x increases. The d intercept is the d value of the line when x equals zero. It basically defines the elevation of the line.

Figure 5:
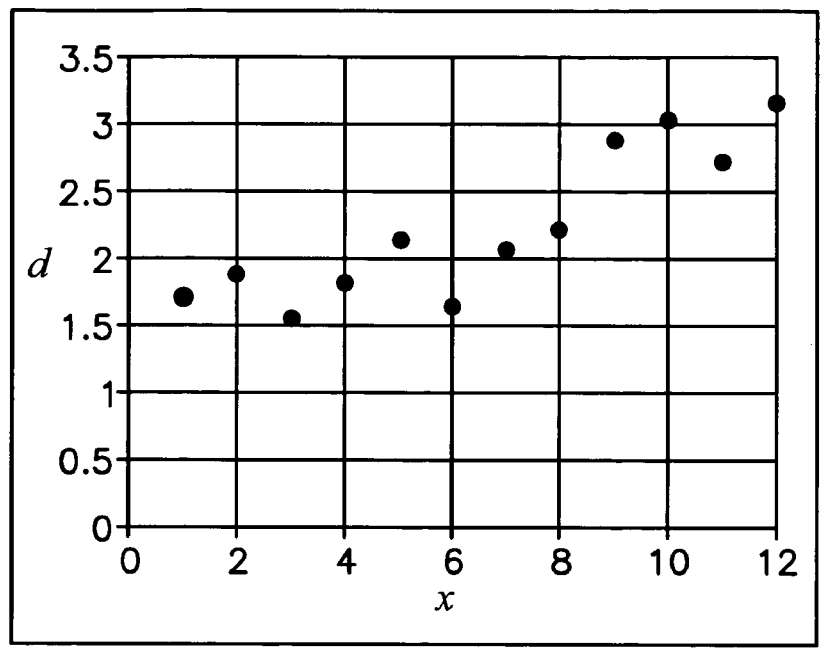
FIG. 5 is a diagram of a linear regression result.

FIG. 5 is a diagram of the plotting of x vs. d. The relationship between the two variables x and d is complex. However, as shown in FIG. 5, when x increases d also increases, (i.e. there is a general trend in the data). The deviation from the straight line could be produced by noise or miss-measurement, and underlying the apparent complexity could be a very simple (possibly linear) relationship between x and d, i.e:

$$d \approx w \times x + b; \quad \text{Equation (1)}$$

or more specifically:

$$d_{(n)} = w \times x_{(n)} + b + e_{(n)} = y_{(n)} + e_{(n)}; \quad \text{Equation (2)}$$

where $e_{(n)}$ is the instantaneous error that is added to $y_{(n)}$ (the linearly fitted value), w is the slope and b is the y intersect (or bias). The problem can be solved by a linear system with only two free parameters, the slope w and the bias b.

Figure 6:
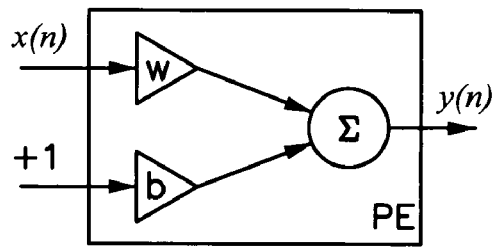
FIG. 6 is a block diagram of a linear regression processing element.

FIG. 6 is a diagram of a linear processing element (PE), or an adaptive linear element (ADALINE). It comprises two multipliers and one adder. The multiplier w scales the input, and the multiplier b is a simple bias, which can also be thought of as an extra input connected to the value +1. The parameters (b, w) have different functions in the solution.

Figure 7:
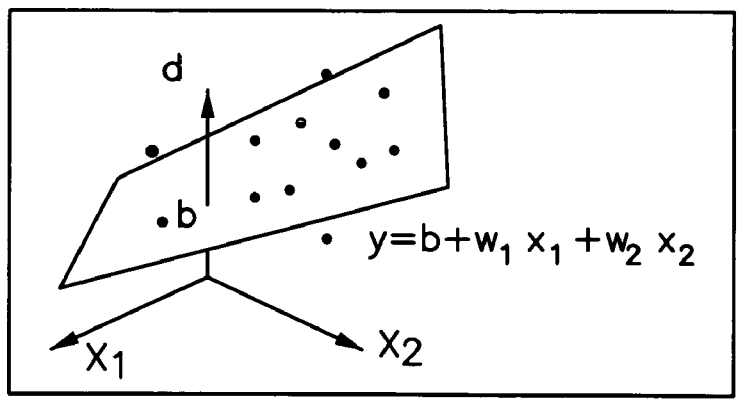
FIG. 7 shows fitting a regression plane to a set of samples in two-dimensional space.

The general purpose of multiple regression is to learn the relationship between several independent or predictor variables and a dependent or criterion variable. Assume that d is a function of several inputs $x_1, x_2, \ldots, x_p$ (independent variables), and the goal is to find the best linear regressor of d on all the inputs. For p=2 this corresponds to fitting a plane through the N input samples, or a hyper-plane in the general case of p dimensions. FIG. 7 shows the fitting of a regression plane to a set of samples in 2D space.

Figure 8:
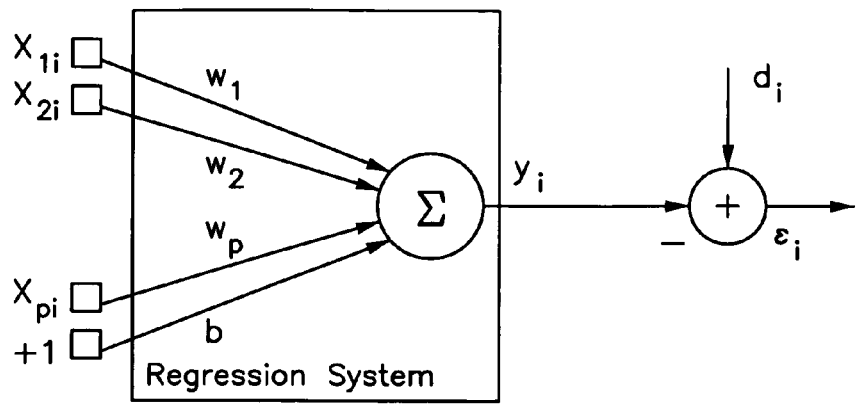
FIG. 8 is a diagram of a regression system for multiple inputs.

In general case, the regression equation is expressed as:

$$e_{(i)} = d_{(i)} - \left(b + \sum_{k=0}^{p} w_{(k)} x_{(i,k)}\right) = d_{(i)} - \sum_{k=0}^{p} w_{(k)} x_{(i,k)}; \quad \text{Equation (3)}$$

where $w_0 = b$ and $x_{(i,0)} = 1$. The goal of the regression is to find the coefficient vector W that minimizes the mean square error (MSE) of e(i) over the i samples. FIG. 8 shows that the linear PE has p inputs and one bias.

The method of least squares assumes that the best-fit curve of a given type is the curve that has the minimal sum of the deviations squared (least square error) from a given set of data. Suppose that the data points are $(x_1, y_1), (x_2, y_2), \ldots, (x_n, y_n)$, where x is the independent variable and y is the dependent variable. The fitting curve d has the deviation (error) σ from each data point, i.e., $\sigma_1 = d_1 - y_1, \sigma_2 = d_2 - y_2, \ldots, \sigma_n = d_n - y_n$. According to the method of least squares, the best fitting curve has the property that:

$$J = \sigma_1^2 + \sigma_2^2 + \ldots + \sigma_n^2 = \quad \text{Equation (4)}$$
$$\sum_{i=1}^{n} \sigma_i^2 = \sum_{i=1}^{n} [d_{(i)} - y_{(i)}]^2 = \text{a minimum}$$

Figure 9:
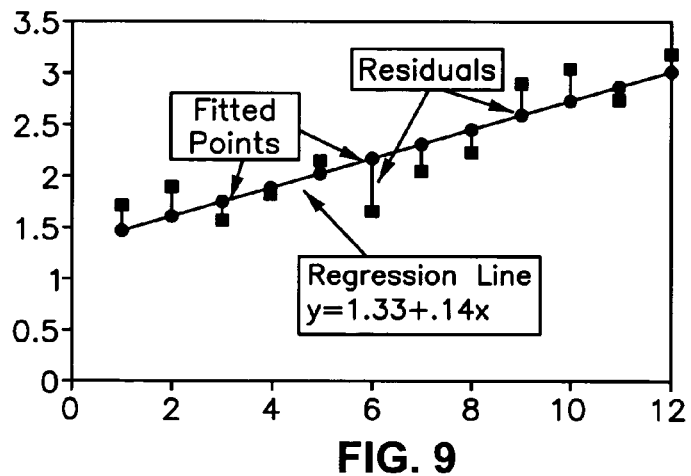
FIG. 9 shows a regression result with deviations.

Least squares solves the problem by finding the line for which the sum of the square deviations (or residuals) in the d direction are minimized. FIG. 9 is a diagram of a regression line showing the deviations.

The goal is to find a systematic procedure to find the constants b and w which minimizes the error between the true value $d_{(n)}$ and the estimated value $y_{(n)}$ which is called the linear regression:

$$d_{(n)} - (b + wx_{(n)}) = d_{(n)} - y_{(n)} = e_{(n)}.$$

Equation (5)

In order to pick the line which best fits the data, a criterion is required to determine which linear estimator is the "best". The sum of square errors (also called a mean square error (MSE)) is a widely utilized performance criterion:

$$J = \frac{1}{2N} \sum_{n=1}^{N} e_{(n)}^2;$$

Equation (6)

where N in the number of observations and J is the mean square error.

The goal is to minimize J analytically, which can be achieved by taking the partial derivative of this quantity with respect to the unknowns and equate the resulting equations to zero, as follows:

$$\begin{cases} \frac{\delta J}{\delta b} = 0 \\ \frac{\delta J}{\delta w} = 0 \end{cases};$$

Equation (7)

which yields after some manipulation to:

$$b = \frac{\sum_n x_{(n)}^2 \sum_n d_{(n)} - \sum_n x_{(n)} \sum_n x_{(n)} d_{(n)}}{N \sum_n (x_{(n)} - \bar{x})^2}$$

$$w = \frac{\sum_n (x_{(n)} - \bar{x})(d_{(n)} - \bar{d})}{\sum_n (x_{(n)} - \bar{x})^2};$$

Equation (8)

where the bar over the variable means the mean value and the procedure to determine the coefficients of the line is called the least square method.

Least square method for a multiple variable case is explained. The MSE in multiple variable case becomes:

$$J = \frac{1}{2N} \sum_n \left( d_{(n)} - \sum_{k=0}^{p} w_{(k)} x_{(n,k)} \right)^2.$$

Equation (9)

The solution to the extreme (minimum) of this equation can be found exactly in the same way as before, i.e. by taking the derivatives of J with respect to the unknowns ($w_{(k)}$), and equating the result to zero. This solution is the normal matrix equation:

$$\sum_n x_{(n,j)} d_{(n)} = \sum_{k=0}^{p} w_{(k)} \sum_n x_{(n,k)} x_{(n,j)};$$

Equation (10)

for j=0, 1, ..., p.

The size of the MSE (J) can be used to determine which line best fits the data. However, it does not necessarily reflect whether a line fits the data at all. The size of the MSE is dependent upon the number of data samples and the magnitude (or power) of the data samples. For instance, by simply scaling the data, the MSE can be changed without changing how well the data is fit by the regression line.

The correlation coefficient (c) solves this problem by comparing the variance of the predicted value with the variance of the desired value. The value $r^2$ represents the amount of variance in the data captured by the linear regression:

$$c^2 = \frac{\sum_n (y_{(n)} - \bar{d})^2}{\sum_n (d_{(n)} - \bar{d})^2}.$$

Equation (11)

By substituting $y_{(n)}$ by the equation of the regression line, a correlation coefficient is obtained as follows:

$$c = \frac{\frac{\sum_n (x_{(n)} - \bar{x})(d_{(n)} - \bar{d})}{N}}{\sqrt{\frac{\sum_n (d_{(n)} - \bar{d})^2}{N}} \sqrt{\frac{\sum_n (x_{(n)} - \bar{x})^2}{N}}}.$$

Equation (12)

The numerator is the covariance of the two variables, and the denominator is the product of the corresponding standard deviations. The correlation coefficient is confined to the range [−1, 1]. When c=1 there is a perfect positive correlation between x and d, (i.e. they co-vary). When c=−1, there is a perfect negative correlation between x and d, (i.e. they vary in opposite ways). When c=0 there is no correlation between x and d. Intermediate values describe partial correlations.

The method of least squares is very powerful, since it has no bias and minimizes the variance. It can be generalized to higher order polynomial curves such as quadratics, cubic, etc. Regression can also be extended to multiple variables, where the dependence of d is not a single variable x, but a vector $X = [x_1, \ldots, x_p]^T$, where T means a transpose and vectors are denoted by capital letters. In this case the regression line becomes a hyper-plane in the space $x_1, x_2, \ldots, x_p$.

The autocorrelation of the input samples for indices k, j is defined as follows:

$$R_{(n,j)} = \frac{1}{N} \sum_n x_{(n,k)} x_{(n,j)}.$$

Equation (13)

Knowing that the autocorrelation measures similarity across the input samples, when k=j, R is just the sum of the squares of the input samples (the power in the data). When k differs from j, R measures the sum of the cross-products for every possible combination of the indices. Thus, one obtains information about the structure of the data set. The cross-correlation of the input x for index j and desired response y is defined as follows:

$$P_{(j)} = \frac{1}{N}\sum_n x_{(n,j)}d_{(n)};\qquad\text{Equation (14)}$$

which can be also put into a vector P of dimension p+1. Substituting these definitions in Equation (10), the set of normal equations can be written by:

$$P=RW^* \text{ or } W^*=R^{-1}P;\qquad\text{Equation (15)}$$

where W is a vector with the p+1 weights $w_i$ in which W* represents the value of the vector for the optimum (minimum) solution. The solution of the multiple regression problems can be computed analytically as the product of the inverse of the autocorrelation of the input samples multiplied by the cross-correlation vector of the input and the desired response.

Since the regression coefficient for $x_1$ is larger than $x_2$, the variable $x_1$ (speed) affects the quality more than variable $x_2$ (feed rate). The multiple correlation coefficient $c_m$ can also be defined in the multiple dimensional case for a single output, as follows:

$$c_{(m)} = \sqrt{\frac{W^*U_{(x)}D - N\bar{d}^2}{D^TD - N\bar{d}^2}};\qquad\text{Equation (16)}$$

which measures the amount of variation explained by the linear regression, normalized by the variance of D. In this expression, D is the vector built from the desired responses $d_i$, and U is a matrix containing the input data vectors.

The purpose of least squares is to find parameters (b, $w_1$, $w_2$, ..., $w_p$) that minimize the difference between the system output $y_{(n)}$ and the desired response $d_{(n)}$. Regression is a procedure for effectively computing the optimal parameters of an interpolating system which predicts the value of d from the value of x.

Figure 10:
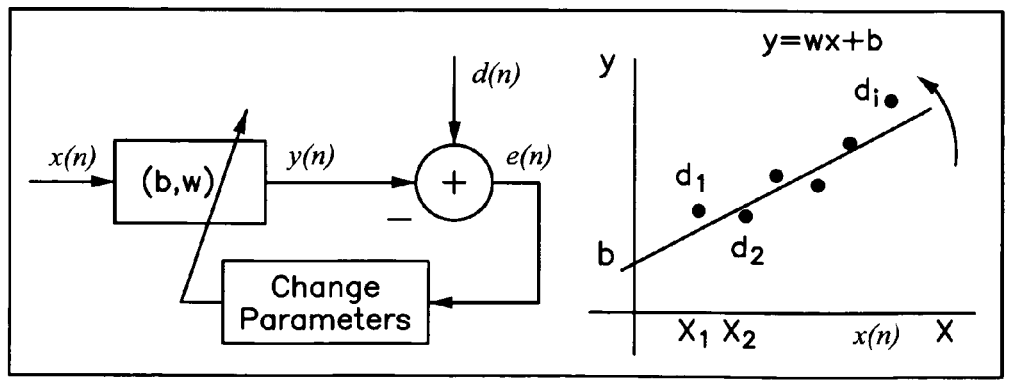
FIG. 10 is a block diagram of a regression system and a plot diagram of inputs and a regression result.

FIG. 10 shows the operation of adapting the parameters of the linear system. The system output y is always a linear combination of the input x with the bias, so it has to lie on a straight line of equation y=wx+b. Changing b modifies the y intersect, while changing w modifies the slope. Linear regression adjusts the position of the line such that the average square difference between the y values (on the line) and the cloud of points $d_{(n)}$ i.e. the error $e_{(n)}$, is minimized.

The key point is to recognize that the error contains information which can be used to optimally place the line. FIG. 10 shows this by including a subsystem which accepts the error and modifies the parameters of the system. Thus, the error $e_{(n)}$ is feedback to the system and indirectly affects the output through a change in the parameters (b,w).

Figure 11:
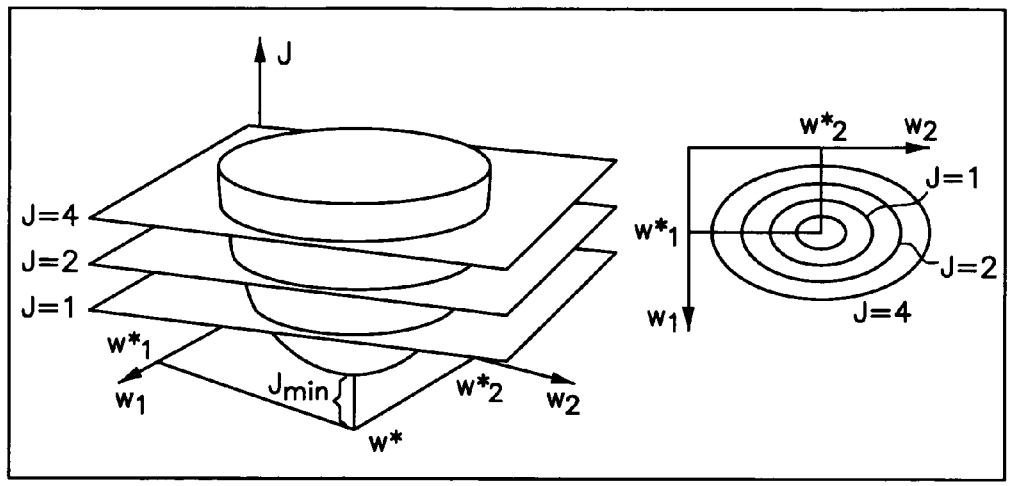
FIG. 11 is a diagram of a performance surface for 2 dimensions and its contour plot.

The performance surface concept can be extended to p+1 dimensions, making J a paraboloid facing upwards as shown in FIG. 11. The definition of J is in matrix notation but remains quadratic as follows:

$$J = \left[W^TRW - 2P^TW + \sum_n \frac{d_{(n)}^2}{N}\right].\qquad\text{Equation (17)}$$

The values of the coefficients that minimize the solution are:

$$\nabla J=0=RW-P \text{ or } W^*=R^{-1}P;\qquad\text{Equation (18)}$$

which gives exactly the same solution as Equation (15). In the space ($w_1$, $w_2$), J is a parabola facing upwards.

Mean square error (J) is analyzed as the parameters of the system w are changed. Without loss of generality, it is assumed that b=0 (or equivalently that the mean of x and d are subtracted), such that J becomes a function of the variable w as follows:

$$J = \frac{1}{2N}\sum_n (d(n) - wx(n))^2 =\qquad\text{Equation (19)}$$
$$\frac{1}{2N}\sum (x^2(n)w^2 - 2d(n)x(n)w + d^2(n)).$$

Figure 12:
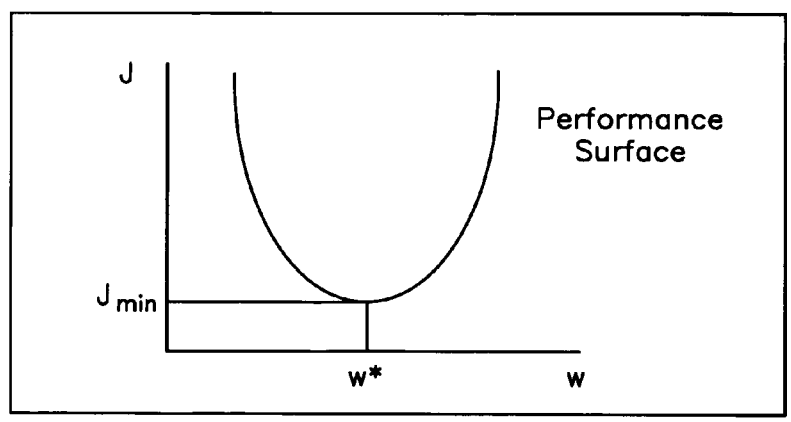
FIG. 12 is a diagram of the performance surface.

If w is treated as the variable and all other parameters are held constant, J is quadratic on w with the coefficient of $w^2(x^2(n))$ which is always positive. In the space of the possible w values, J is a parabola facing upwards (J is always positive since it is a sum of squares). The function J(w) is called the performance surface for the regression problem which is the total error surface plotted in the space of the system coefficients (weights) as shown in FIG. 12. The performance surface is an important tool which visualizes how the adaptation of the weights affects the MSE.

Figure 13:
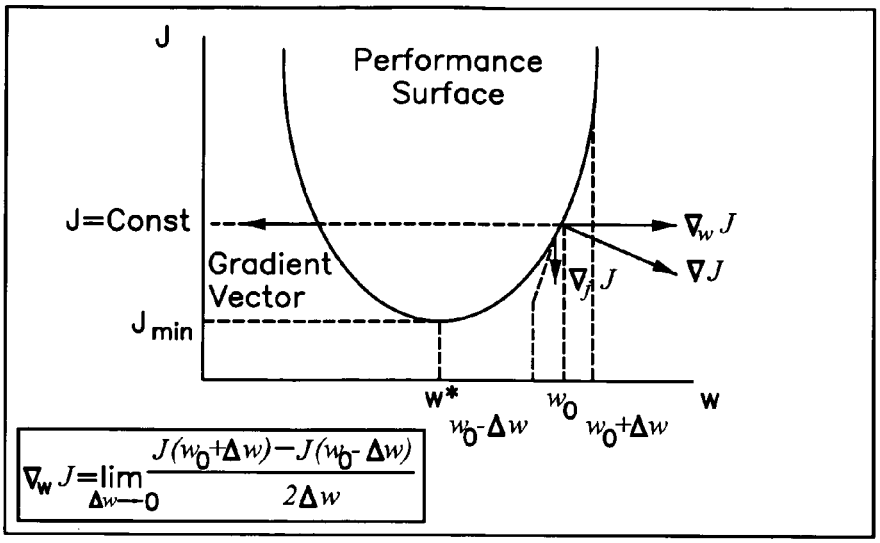
FIG. 13 a diagram of performance surface and its gradient.

Using the performance surface, a geometric method can be developed for finding the value of w, w*, which minimizes the performance criterion. w* is computed by setting the derivative of J with respect to w equal to zero. The gradient of the performance surface is a vector (with the dimension of J) which always points towards the direction of maximum change and with a magnitude equal to the slope of the tangent of the performance surface as shown in FIG. 13. If the performance surface is visualized as a hillside, each point on the hill has a gradient arrow which points in the steepest direction at that point with larger magnitudes for steeper slopes. Thus, a ball rolling down the hill always attempts to roll in the direction of the gradient arrow, and ends up at the bottom.

In this case, the gradient has two components, one along the weight axis w and another along the J axis $\nabla J=\nabla_W J+\nabla_J J$. The component of the gradient in interest is the one along the unknown parameter direction $\nabla_W J$, and only this component will be referred to hereinafter. A graphical way to construct this component of the gradient of J at a point $w_0$ is to first find the contour curve (curve of constant value) at the point. The gradient is always perpendicular to the contour curve at $w_0$, with a magnitude given by the partial derivative of J with respect to the weight w:

$$\nabla_w J = \frac{\delta J}{\delta w}.\qquad\text{Equation (20)}$$

At the bottom of the bowl, the gradient is zero, because the parabola has slope 0 at the vertex. For a quadratic performance surface, by computing the gradient and equating it to zero, the value of the coefficients that minimize the cost can be found, such as in Equation (8). The analytical solution found by the least squares coincides with the minimum of the performance surface. Substituting the value of w* into Equation (19), the minimum value of the error ($J_{min}$) can be computed.

For a quadratic performance surface, the value of the coefficients that minimize the cost is as follows:

$$\nabla J = \frac{\delta J}{\delta w} = 0 = \frac{1}{N}\left(-\sum_n d_{(n)}x_{(n)} + w\sum_n x_{(n)}^2\right); \quad \text{Equation (21)}$$

or;

$$w^* = \frac{\sum_n x_{(n)}d_{(n)}}{\sum_n x_{(n)}^2}. \quad \text{Equation (22)}$$

This solution is fundamentally the same as found in Equation (8) (b=0 is equivalent to assuming that the average value of x and d are zero). The analytical solution found by the least squares coincides with the minimum of the performance surface. Substituting this value of w* into Equation (19), the minimum value of the error becomes as follows:

$$J_{(min)} = \frac{1}{2N}\left[\sum_n d_{(n)}^2 - \frac{\left(\sum_n d_{(n)}x_{(n)}\right)^2}{\sum_n x_{(n)}^2}\right]. \quad \text{Equation (23)}$$

Equation (19) can be re-written as follows:

$$J = J_{(min)} + \frac{1}{2N}(w - w^*)\sum_n x_{(n)}^2(w - w^*). \quad \text{Equation (24)}$$

Summarizing, the input data controls both the shape of the performance surface as well as the location and value of the minimum. However, changing the desired response only modifies the location of w* and the value of the minimum error.

In multiple variable case, the minimum value of the error can be obtained by substituting Equation (18) into Equation (17), yielding:

$$J_{(min)} = \frac{1}{2}\left[\sum_n \frac{d_{(n)}^2}{N} - P^T W^*\right]. \quad \text{Equation (25)}$$

The performance surface can be rewritten in terms of its minimum value and W* as follows:

$$J = J_{(min)} + \frac{1}{2}(W - W^*)^T R(W - W^*). \quad \text{Equation (26)}$$

Figure 14:
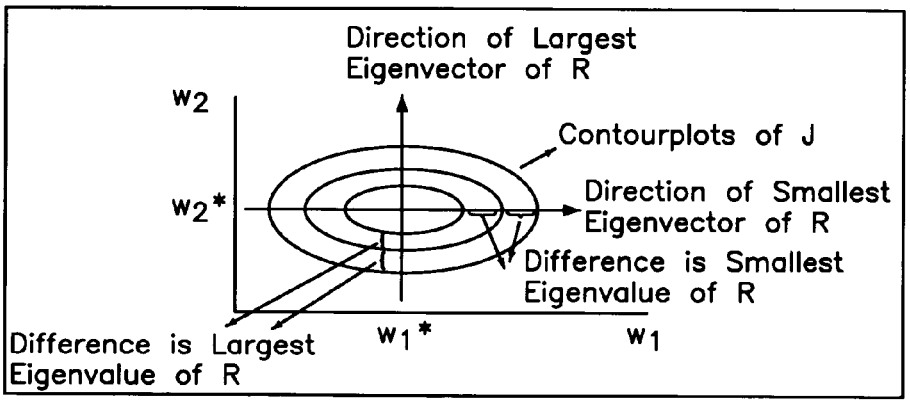
FIG. 14 is a diagram of contour plots of the performance surface with two weights.

For the one dimensional case, this equation is the same as Equation (24) (R becomes a scalar equal to the power of the input). In the space ($w_1$, $w_2$), J is now a parabola facing upwards. The shape of J is solely dependent upon the input data (through its autocorrelation function). The principal axes of the performance surface contours (surfaces of equal error) correspond to the eigenvectors of the input correlation matrix R, while the eigenvalues of R give the rate of change of the gradient along the principal axis of the surface contours of J as shown in FIG. 14.

The eigenvectors and eigenvalues of the input autocorrelation matrix are all what matters to understand convergence of the gradient descent in multiple dimensions. The eigenvectors represent the natural (orthogonal) coordinate system to study the properties of R. In fact, in this coordinate system, the convergence of the algorithm can be studied as a joint adaptation of several (one for each dimension of the space) unidimensional algorithms. Along each eigenvector direction the algorithm behaves just like the one variable case. The eigenvalue becomes the projection of the data onto that direction just like λ in Equation (25) is the projection of the data on the weight direction.

The location of the performance surface in weight space depends upon both the input and desired response. The minimum error is also dependent upon both data. Multiple regressions find the location of the minimum of a paraboloid placed in an unknown position in the weight space. The input distribution defines the shape of the performance surface. The input distribution and its relation with the desired response distribution define both the value of the minimum of the error and the location in coefficient space where that minimum occurs. The autocorrelation of the input (R) thus completely specifies the shape of the performance surface. However, the location and final error depend also on the desired response.

Search of the performance surface with steepest descent is explained. The method of steepest descent (also known as the gradient method) is the simplest example of a gradient-based method for minimizing a function of several variables.

Since the performance surface is a paraboloid which has a single minimum, an alternate procedure to finding the best value of the coefficient w is to search the performance surface instead of computing the best coefficient analytically by Equation (8). The search for the minimum of a function can be done efficiently using a broad class of methods that use gradient information. The gradient has two main advantages for search: the gradient can be computed locally; and the gradient always points in the direction of maximum change.

Figure 15:
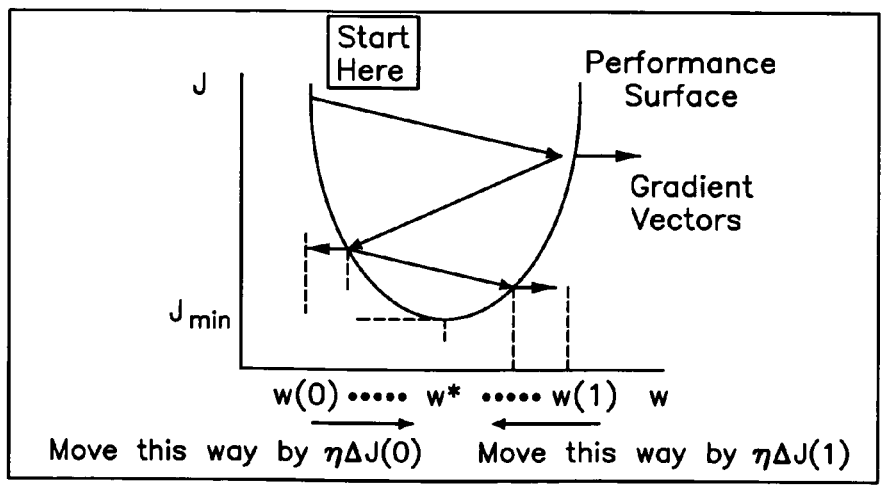
FIG. 15 shows a procedure for searching the minimum using the gradient information.

If the goal is to reach the minimum, the search must be in the direction opposite to the gradient. So, the overall method of search can be stated in the following way:

The search is started with an arbitrary initial weight $w_{(0)}$, where the iteration is denoted by the index in parenthesis. Then, the gradient of the performance surface is computed at $w_{(0)}$, and the initial weight is modified proportionally to the negative of the gradient at $w_{(0)}$. This changes the operating point to $w_{(1)}$. Then the gradient is computed at the new position $w_{(1)}$, and the same procedure is applied again. The process is expressed as follows:

$$w_{(k+1)} = w_{(k)} - \eta \nabla J_{(k)}; \quad \text{Equation (27)}$$

where η is a small constant and ∇J denotes the gradient of the performance surface at the $k^{th}$ iteration. η is used to maintain stability in the search by ensuring that the operating point does not move too far along the performance surface. This search procedure is called the steepest descent method. FIG. 15 illustrates the search procedure.

If the path of the weights is traced from iteration to iteration and the constant η is small, eventually the best value for the coefficient w* will be found. Whenever w>w*, w is decreased, and whenever w<w*, w is increased.

In the multiple variable case, gradient techniques can also be used to find the minimum of the performance surface, but the gradient is a vector with p+1 components as follows:

$$\nabla J = \left[\frac{\delta J}{\delta w_0}, \ldots, \frac{\delta J}{\delta w_0}\right]^T.$$ Equation (28)

The extension of Equation (27) in which all quantities are vectors:

(i.e. $W_{(k)} = [w_{(0)_{(k)}}, \ldots, w_{(p)_{(k)}}]^T$), Equation (29)

is: $W_{(k+1)} = W_{(k)} - \eta \nabla J_{(k)}$.

An adaptive system uses the gradient to optimize its parameters. The gradient, however, is usually not known analytically, and thus must be estimated. Traditionally, gradient estimation is done by estimating the derivative using the difference operator. A good estimate, however, requires many small perturbations to the operating point to obtain a robust estimation through averaging. The method is straight forward but not very practical.

In the prior art, use of the instantaneous value of the gradient as the estimator for the true quantity has been disclosed. This means that the summation in Equation (19) is dropped, and the gradient estimate at step k is defined as its instantaneous value. Substituting Equation (6) into Equation (20), removing the summation, and then taking the derivative with respect to w yields:

$$\nabla J_{(k)} = \frac{\partial}{\partial w} J_{(k)} = \frac{\partial}{\partial w} \frac{1}{2N} \sum e^2 \approx \frac{1}{2} \frac{\partial}{\partial w}(e_{(k)}^2 x_{(k)}).$$ Equation (30)

In accordance with Equation (30), an instantaneous estimate of the gradient is simply the product of the input to the weight times the error at iteration k. This means that with one multiplication per weight, the gradient can be estimated. This is the gradient estimate that leads to the famous Least Means Square (LMS) algorithm. However, the estimate is noisy, since the algorithm uses the error from a single sample instead of summing the error for each point in the data set, (e.g. the MSE is estimated by the error for the current sample). The adaptation process does not find the minimum in one step. Many iterations are normally required to find the minimum of the performance surface, and during this process the noise in the gradient is averaged or filtered out.

If the estimator of Equation (30) is substituted in Equation (29), the steepest descent equation becomes:

$w_{(k+1)} = w_{(k)} + \eta e_{(k)} x_{(k)}$. Equation (31)

This equation is the LMS algorithm. With the LMS rule, one does not need to worry about perturbation and averaging to properly estimate the gradient during iteration. It is the iterative process that improves the gradient estimator. The small constant $\eta$ is called the step size or the learning rate.

The LMS algorithm for multiple weights is explained. It is straightforward to extend the gradient estimation given by the LMS algorithm from one dimension to many dimensions because the estimation is local. The instantaneous gradient estimate in Equation (30) is applied to each element of Equation (29). The LMS for multiple dimensions reads (W and X are vectors) as follows:

$W_{(k+1)} = W_{(k)} + \eta e_{(k)} X_{(k)}$. Equation (32)

The LMS adaptation rule uses local computations, therefore it can be rewritten for each weight i as follows:

$w_{(n)(k+1)} = w_{(n)(k)} + \eta e_{(k)} x_{(n)(k)}$. Equation (33)

Although the analysis of the gradient descent techniques is complex, the LMS algorithm itself is still very simple. This is one reason why the LMS is so widely used. However, since the LMS is a steepest descent algorithm, the analysis and discussions concerning the largest step size for convergence and coupling of modes also apply to the LMS algorithm.

One of the interesting aspects of the LMS solution is its robustness. No matter what is the initial condition for the weights, the solution always converges to basically the same values. Even some noise can be added to the desired response and the linear regression parameters are basically unchanged. This robustness is important for real world applications, where noise is omnipresent.

The correlation coefficient, c, indicates how much of the variance of d is captured by a linear regression on the independent variable x. As such, c is a very powerful quantifier of the result of the modeling. It has a great advantage with respect to the MSE because it is automatically normalized, while the MSE is not. However, the correlation coefficient is blind to differences in means because it is a ratio of variances (see Equation 11). Therefore, one effectively needs both quantities (c and MSE) when testing the results of regression.

Equation (11) presents a simple way of computing the correlation coefficient requiring only knowledge of y and d. However, y changes during adaptation. So, one should wait until the system adapts to read the final correlation coefficient. During adaptation, the numerator of Equation (11) can be larger than the denominator giving a value for c larger than 1, which is meaningless.

The parameter g during the iterations that will converge to the correlation coefficient when the ADALINE adapts. A term is subtracted from the numerator of Equation (11) that becomes zero at the optimal setting but limits g such that its value is always between −1 and 1 even during adaptation. The parameter g is written as follows:

$$g = \frac{\sqrt{(y_n - \bar{d})^2} - \dfrac{\sum_n e_{(n)}(y_n - \bar{d})}{\sqrt{\sum_n (y_n - \bar{d})^2}}}{\sqrt{\sum_n (d_{(n)} - \bar{d})^2}}.$$ Equation (34)

However, Equation (34) measures only the correlation coefficient when the ADALINE has been totally adapted to the data. The correlation coefficient can be approximated for the multiple regression case by Equation (34).

Figure 16:
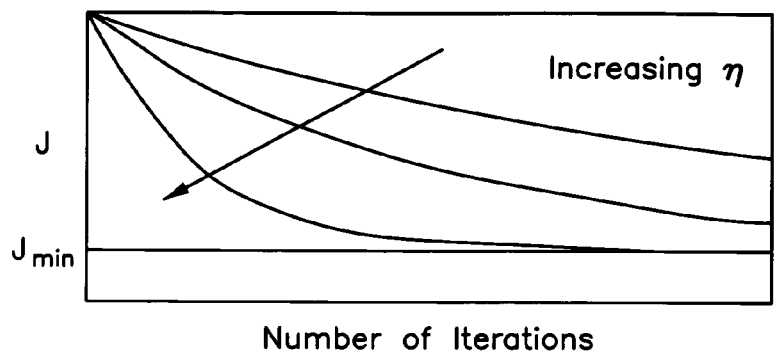
FIG. 16 is a diagram of a learning curve.

During adaptation, the learning algorithm automatically changes the system parameters of Equation (31). The adaptation algorithm has parameters (e.g. the step size) that must be selected. As shown in FIG. 15, when the weights approach the optimum value, the values of $J_{(w_{(k)})}$ (the MSE at iteration k) will also decrease, approaching its minimum value $J_{(min)}$. One of the best ways to monitor the convergence of the adaptation process is to plot the error value at each iteration. The plot of the MSE across iterations is called the learning curve as shown in FIG. 16. The learning curve is as important for adaptive systems. It is an external, scalar, and easy to compute indication of how well the system is learning. But, it is unspecific, (i.e. when the system is not learning it does not indicate the reason).

The error's rate decrease depends on the value of the step size η. Larger step sizes take less iterations to reach the neighborhood of the minimum provided the adaptation converges.

An adaptive system modifies its weights in an effort to find the best solution. The plot of the value of a weight over time is called the weight tracks. Weight tracks are an important and direct measure of the adaptation process. The problem is that normally the system in accordance with the present invention has many weights and does not know what their optimal values are. Nevertheless the dynamics of learning can be inferred and monitored from the weight tracks.

Weight tracks for one-dimensional case are explained. In the gradient descent adaptation, adjustments to the weights are governed by two quantities: the step size η and the value of the gradient at the point. Even for a constant step size, the weight adjustments become smaller and smaller as the adaptation approaches w*, since the slope of the quadratic performance surface decreases near the bottom of the performance surface. Thus, the weights approach their final values asymptotically as shown in FIG. 17.

Figure 17:
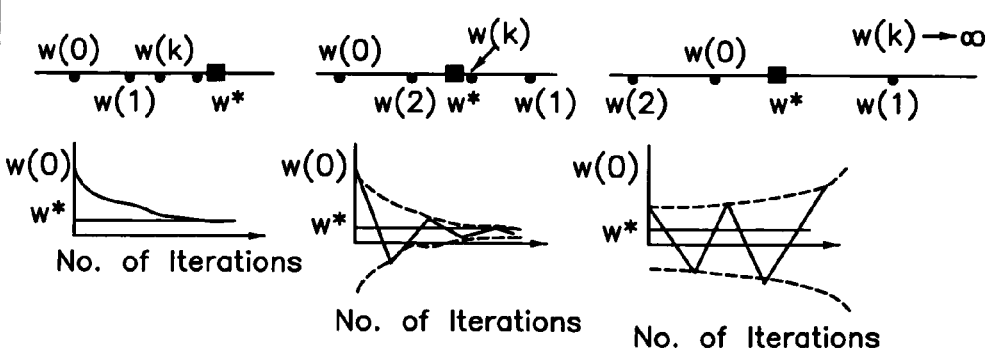
FIG. 17 is a diagram of weight tracks and plots of the weight values across iteration for 3 values of η.
Figure 18A:
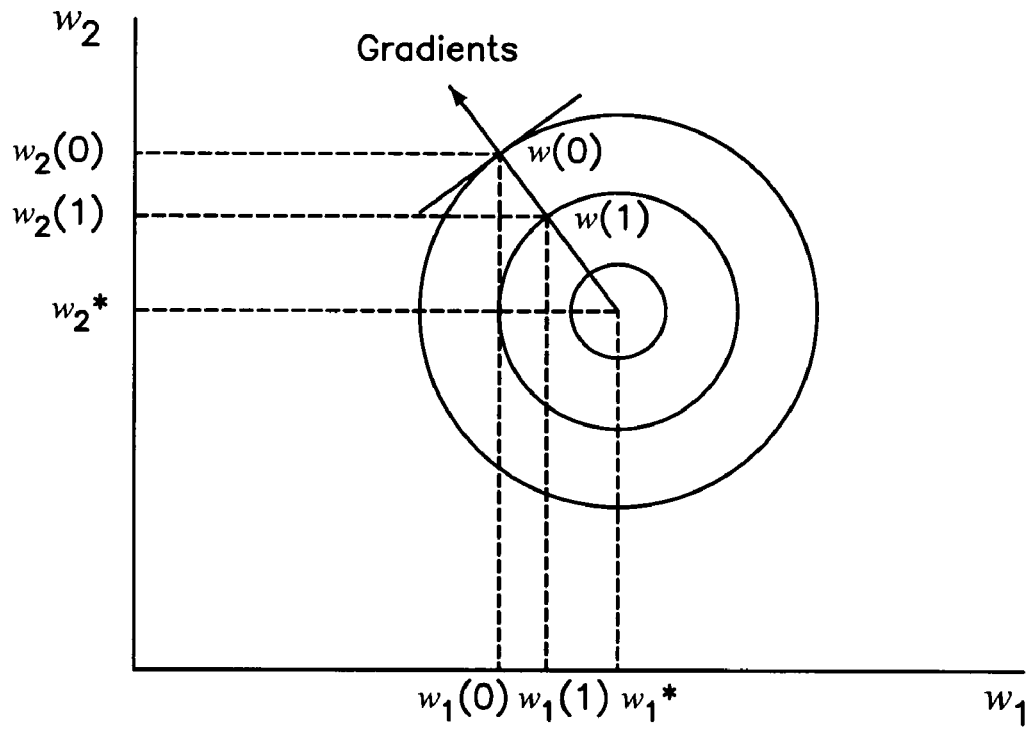
FIGS. 18(*a*) and 18(*b*) are diagrams of a weight track toward the minimum; equal eigenvalues and unequal eigenvalues cases, respectively.
Figure 18B:
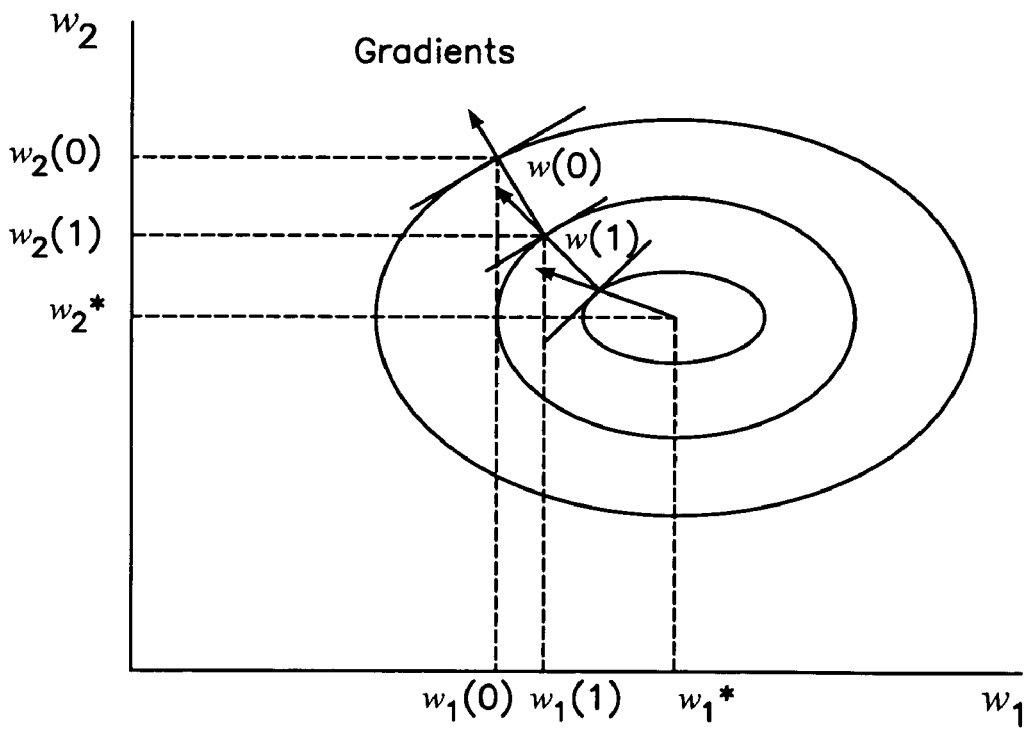

Three cases are depicted in FIG. 17. If the step size is small, the weights converge monotonically to w*, and the number of iterations to reach the bottom of the bowl is large. If the step size η is increased, the convergence will be faster but still monotonic. After a value called critically damped, the weights will approximate w* in an oscillatory fashion ($\eta_2 > \eta_1$), i.e. will overshoot and undershoot the final solution. The number of iterations necessary to reach the neighborhood of w* will increase again. If the step size is too large ($\eta_3 > \eta_2$), the iterative process will diverge, i.e. instead of getting closer to the minimum, the search will visit points of larger and larger MSE, until there is a numeric overflow.

The set of points visited by the weights during the adaptation is called the weight track. The weight tracks are perpendicular to the gradient at each point. It is important to provide a graphical construction for the gradient at each point of the contour plot, because once the gradient direction is known, the direction that the next weight is going to be is opposite to the gradient.

Given a point in a contour, the tangent of the contour is taken at the point. The gradient is perpendicular to the tangent, so the weights move along the gradient line and point in the opposite direction. When the eigenvalues are the same, the contour plots are circular and the gradient always points to the center, (i.e. to the minimum). In this case the gradient descent only has a single time constant as in the one dimensional case.

In general, the eigenvalues are different. When the eigenvalues are different, the weight track bends because it follows the direction of the gradient at each point, which is perpendicular to the contours as shown in FIG. 15. So the gradient direction does not point to the minimum, which means that the weight tracks are not straight lines to the minimum. The adaptation takes longer because a longer path to the minimum is taken and the step-size must be decreased compared to the circular case.

Preferably, the largest step size possible is chosen for fastest convergence without creating an unstable system. Since adjustment to the weights is a product of the step size and the local gradient of the performance surface, the largest step size depends also on the shape of the performance surface.

One Dimensional (uni-variable) algorithm.

The shape of the performance surface is controlled by the input data, (see Equation (19)), which is expressed as follows:

$$J = J_{min} + \frac{1}{2N}(w - w^*)\sum_n x_n^2(w - w^*). \quad \text{Equation (35)}$$

The maximum step size is dictated by the input data. If the equations are rewritten such that produce the weight values in terms of the first weight $w_{(0)}$, the following equation is obtained:

$$w_{(k+1)} = w^* + (1 - \eta\lambda)^k(w_{(0)} - w); \quad \text{Equation (36)}$$

where;

$$\lambda = \frac{1}{N}\sum_n x_{(n)}^2. \quad \text{Equation (37)}$$

Since the term $(1-\eta\lambda)$ is exponential, it must be less than one to maintain stability of the weights and to guarantee convergence to 0, giving $w_{(k+1)} = w^*$). This implies that:

$$|\rho| = |1 - \eta\lambda| < 1 \Rightarrow \eta < \frac{2}{\lambda}, \quad \text{Equation (38)}$$

where ρ is the geometric ratio of the iterative process. Hence, the value of the step size η must always be smaller than 2/λ. The fastest convergence is obtained with the critically damped step size of 1/λ. The closer η is to 1/λ, the faster is the convergence. However, faster convergence also means that the iterative process is closer to instability. In FIG. 13, when η is increased, a monotonic (over-damped) convergence to w* is substituted by an alternating (under-damped) convergence that finally degenerates into divergence.

However, there is a drawback with this approach. During batch learning the weight updates are added together during an epoch to obtain the new weight. This effectively includes a factor of N in the LMS weight update formula in Equation (31). In order to apply the analysis of the largest step size of Equation (38) one has to use a normalized step size:

$$\eta_n = \frac{\eta}{N}. \quad \text{Equation (39)}$$

However, since the LMS uses an instantaneous (noisy) estimate of the gradient, even when η obeys Equation (38), instability may occur. When the iterative process diverges, the algorithm "forgets" its location in the performance surface, (i.e. the values of the weights will change drastically). This means that all the iterations up to that point were wasted. Hence, with the LMS it is common to include a safety factor of 10 in the largest η(η=0.1/λ).

Multivariable case.

The condition to guarantee convergence is:

$$\lim_{k \to \infty} (I - \eta \Lambda)^k;  \quad \text{Equation (40)}$$

where $\Lambda$ is the eigen-value matrix:

$$\Lambda = \begin{bmatrix} \lambda_0 & \ldots & 0 \\ \ldots & \ldots & \ldots \\ 0 & \ldots & \lambda_p \end{bmatrix}, \quad \text{Equation (41)}$$

which means that in every principal direction of the performance surface (given by the eigenvectors of the input correlation matrix (R) one must have:

$$0 < \eta < \frac{2}{\lambda_n}, \quad \text{Equation (42)}$$

where $\lambda_i$ is the corresponding eigen-value. This equation also means that with a single $\eta$ each weight $w_{(n)(k)}$ approaches its optimal value $w^*_{(n)}$ with a different time constant ("speed"). So the weight tracks bend and the path is no longer a straight line towards the minimum.

This is the mathematical description of the gradient descent algorithm that behaves as many one dimensional uni-variable algorithms along the eigenvector directions. Equation (41) is diagonal, so there is no cross-coupling between time constants along the eigenvector directions.

Figure 19:
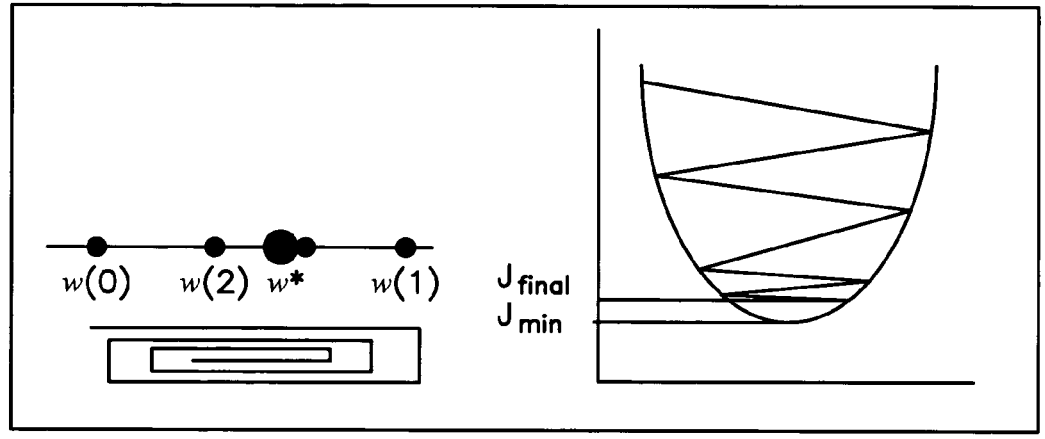
FIG. 19 shows rattling of the iteration procedure.

In any other direction of the space, there will be coupling. However, the overall weight tract can be decomposed as a combination of weight tracts along each eigen-direction as shown in FIG. 19. Equation (42) shows that the step-size along each direction obeys the same rule as the uni-dimensional case.

The worst case condition to guarantee convergence to the optimum W* is therefore as follows:

$$\eta < \frac{2}{\lambda_{max}}. \quad \text{Equation (43)}$$

The step size $\eta$ must be smaller than the inverse of the largest eigen-value of the correlation matrix. Otherwise the iteration will diverge in one (or more) direction. Since the adaptation is coupled, divergence in one direction will cause the entire system to diverge. In the early stages of adaptation, the convergence is primarily along the direction of the largest eigen-value.

When the eigen-value spread, (which is the ratio of the largest over the smallest eigen-value), of R is large, there are very different time constants of adaptation in each direction. This reasoning gives a clear picture of the fundamental constraint of adapting the weights using gradient descent with a single step size $\eta$. The speed of adaptation is controlled by the smallest eigen-value, while the largest step size is constrained by the inverse of the largest eigen-value. This means that if the eigen-value spread is large, the convergence is intrinsically slow.

The learning curve approaches $J_{min}$ in a geometric progression as before. However, there are many different time constants of adaptation, one per each direction. Initially, the learning curve decreases at the rate of the largest eigen-value, but towards the end of adaptation the rate of decrease of J is controlled by the time constant of the smallest eigen-value.

The eigen-value spread can be computed by an eigen-decomposition of R. However, this is a time consuming operation. An estimate of the eigen-value spread is the ratio between the maximum and the minimum of the magnitude of the Fourier transform of the input data.

Alternatively, simple inspection of the correlation matrix of the input can provide an estimation of the time to find a solution. The best possible case is when R is diagonal with equal values in the diagonal. Because in this case the eigen-value spread is 1 and the gradient descent goes in a straight line to the minimum. This is the fastest convergence. When R is diagonal but with different values, the ratio of the largest number over the smallest is a good approximation to the eigen-value spread. When R is fully populated, the analysis becomes much more difficult. If the non-diagonal terms have values comparable to the diagonal terms, a long training time is required.

An alternative view of the adaptive process is to quantify the convergence of $w_{(k)}$ to $w^*$ in terms of an exponential decrease. $w_{(k)}$ converges to $w^*$ as a geometric progression. The envelope of the geometric progression can be approximated by an exponential decrease $\exp(-t/\tau)$, where $\tau$ is the time constant of adaptation.

One dimensional case.

A single iteration can be linked to a time unit. The time constant of adaptation can be written:

$$\tau = \frac{1}{\eta \lambda}; \quad \text{Equation (44)}$$

which clearly shows that fast adaptation (small time constant $\tau$) requires large step sizes. Equation (45) is obtained by writing $\exp(-t/\tau) = \rho$ and expanding the exponential in Taylor series and by approximating $$\rho \approx 1 - \frac{1}{\tau}$$

whose value is substituted in Equation (38).

$$\rho = e^{\left(-\frac{1}{\tau}\right)} = 1 - \frac{1}{\tau} + \frac{1}{2!\tau^2} \ldots . \quad \text{Equation (45)}$$

The steps used to derive the time constant of adaptation can be applied to come up with a closed form solution to the decrease of the cost across iterations. Equation (36) indicates how the weights converge to $w^*$. If the equation for the weight recursion is substituted in the equation for the cost where $$\lambda = \frac{1}{N} \sum_n x^2_{(n)},$$

Equation (46) is obtained:

$$J = J_{\min} + \lambda(1 - \eta\lambda)^{2k}(w_{(0)} - w^*)^2; \qquad \text{Equation (46)}$$

which means that J also approximates $J_{min}$ in a geometric progression, with a ratio equal to $\rho^2$. Therefore the time constant of the learning curve is:

$$\tau_{mse} = \frac{\tau}{2}. \qquad \text{Equation (47)}$$

Since the geometric ratio is always positive, J approximates $J_{min}$ monotonically (i.e. an exponential decrease). These expressions assume that the adaptation follows the gradient. With the instantaneous estimate used in the LMS, J may oscillate during adaptation since the estimate is noisy. But even in LMS, J approaches $J_{min}$ in one-sided way (i.e. always greater than or equal to $J_{min}$).

Multivariable case.

When the adaptation approaches W*, the algorithm converges at the speed of the smallest time constant. Therefore, the time constant of adaptation is:

$$\tau = \frac{1}{\eta\lambda_{\min}}. \qquad \text{Equation (48)}$$

For fast convergence a large step size ($\eta$) is needed. When the search is close to the minimum w*, the gradient is small, but not zero, and the iterative process continues to wander around a neighborhood of the minimum solution without ever stabilizing. This phenomenon is called rattling as shown in FIG. 19, in which the basin increases proportionally to the step size $\eta$. This means that when the adaptive process is stopped by an external command, (such as the number of passes through the data), the weights may not be exactly at w* and not exactly at the optimum.

In accordance with the performance surface in FIG. 19, when the final weights are not at w*, the performance is not optimum, i.e. the final MSE will be higher than $J_{min}$. The difference between the final MSE and the $J_{min}$ (normalized by $J_{min}$) is called the miss-adjustment M:

$$M = \frac{J_{final} - J_{\min}}{J_{\min}}. \qquad \text{Equation (49)}$$

This means that in search procedures that use gradient descent there is an intrinsic compromise between accuracy of the final solution, (small miss-adjustment which is the normalized excess MSE produced by the rattling), and speed of convergence. The parameter that controls this compromise is the step size $\eta$. High $\eta$ means fast convergence but also large miss-adjustment, while small $\eta$ means slow convergence but little miss-adjustment.

For fast convergence to the neighborhood of the minimum, a large step size is desired. However, the solution with a large step size suffers from rattling. One solution is to use a large learning rate in the beginning of training to move quickly towards the location of the optimum weights but then to decrease the learning rate to obtain good accuracy on the final weight values. This is called learning rate scheduling. This simple idea can be implemented with a variable step size controlled by:

$$\eta_{(n+1)} = \eta_{(n)} - \beta, \qquad \text{Equation (50)}$$

where $\eta(0)=\eta 0$ is the initial step size, and $\beta$ is a small constant. The step size is linearly decreased each iteration. If one has control of the number of iterations, the process can be started with a large step size which is decreased to practically zero. The value of $\beta$ needs to be experimentally found. Alternatively, the step size can be annealed geometrically, or logarithmically.

If the initial value of $\eta_0$ is set too high, the learning can diverge. The selection of $\beta$ can be even trickier than the selection of $\eta$ because it is highly dependent on the performance surface. If $\beta$ is too large, the weights may not move quickly enough to the minimum and the adaptation may stall. If $\beta$ is too small, then the search may reach the global minimum quickly and must wait a long time before the learning rate decreases enough to minimize the rattling.

Newton's method is known to find the roots of quadratic equations in one iteration. The minimum of the performance surface can be equated to finding the root of the gradient equation of Equation (28). The adaptive weight equation using the Newton's method is:

$$W_{(k+1)} = W_{(k)} - R^{-1}\nabla J_{(k)}. \qquad \text{Equation (51)}$$

Figure 20:
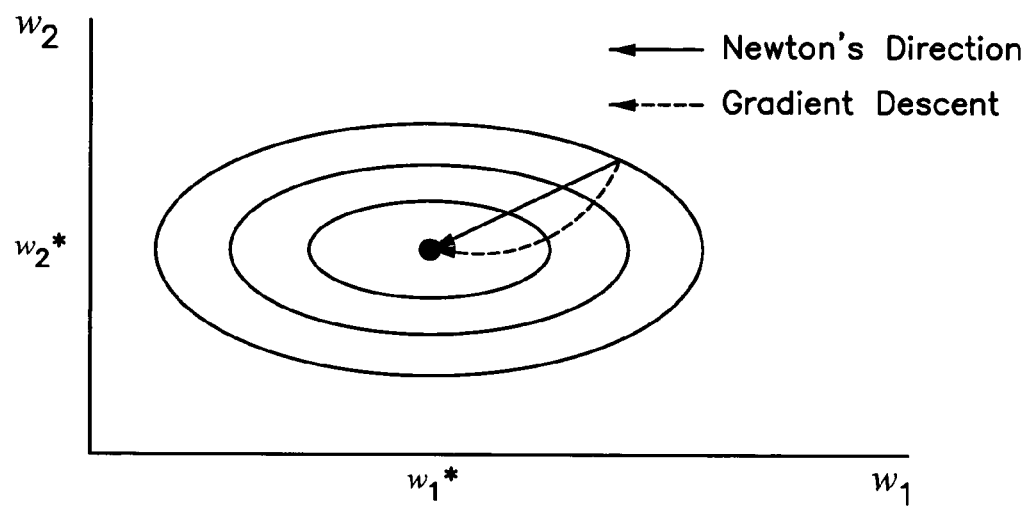
FIG. 20 shows directions of the steepest descent and Newton's method.

Comparing with Equation (29), the gradient information is weighted by the inverse of the correlation matrix of the input, and $\eta$ is equal to one. This means that Newton's method corrects the direction of the search such that it always points to the minimum, while the gradient descent points to the maximum direction of change. These two directions may or may not coincide (see FIG. 20).

They coincide when the contour plots are circles, i.e. when the largest and the smallest eigen-value of the correlation matrix are the same. When the ratio of the largest to the smallest eigen-value increases (the eigen-value spread), the slope of the performance surface in the two directions differs more and more. Accordingly, for large eigen-value spreads, the optimization path taken by gradient descent is normally much longer than the path taken by Newton's method. This implies that Newton's method will be faster than LMS when the input data correlation matrix has a large eigen-value spread.

Another advantage of Newton's method versus the steepest descent is in terms of geometric ratios or time constant of adaptation. When the gradient is multiplied by $R^{-1}$ not only the direction of the gradient is being changed but the different eigen-values in each direction are being equalized. What this means is that Newton's method is automatically correcting the time constant of adaptation for each direction such that all the weights converge at the same rate. Hence, Newton's method has a single time constant of adaptation, unlike the steepest descent method.

Newton's method uses much more information about the performance surface (the curvature). In fact, to implement Newton's method, the inverse of the correlation matrix should be computed which takes significantly longer than a single multiplication in the LMS method and also requires global information. Newton's method is also brittle; i.e. if the surface is not exactly quadratic, the method may diverge. This is the reason Newton's method is modified as follows to have also a small step size $\eta$ instead of using one in Equation (51).

$$W_{(k+1)} = W_{(k)} + \eta R^{-1} e_{(k)} X_{(k)}. \qquad \text{Equation 52)}$$

$X_{(k)}$ is a vector and $R^{-1}$ is a matrix, so the update for one weight influences all the other inputs in the system. This is the reason that the computations are no longer local to each weight.

Alternatively, to improve convergence speed with the LMS, an orthogonalizing transformation of the input correlation function followed by an equalization of the eigenvalues which is called a whitening transformation can be implemented. Since Newton's method coincides with the steepest descent for performance surfaces that are symmetric, this preprocessing makes the LMS perform as Newton.

Multiple regression with bias.

If the bias is added, the computation involves three parameters. The largest step size in the case with bias is different since the input data is effectively changed if one interprets the bias as a weight connected to an extra constant input of one. Hence the autocorrelation function and its eigen-value spread are changed.

The use of a bias is called the full least square solution, and it is the recommended way to apply least squares. When a bias is utilized in the processing element (PE), the regression line is not restricted to pass through the origin of the space, and smaller errors are normally achieved. There are two equivalent ways to solve the full least squares problem for D input variables.

First, input and desired responses need to be modified such that they become zero mean variables. This is called the deviation or z scores or variables that have been normalized to zero mean and unit standard deviation. In this case, a D weight regression effectively solves the original problem. The bias b is computed indirectly by:

$$b = \bar{d} - \sum_{n=1}^{N} w_{(n)} \bar{x}_{(n)};$$
Equation (53)

where w(i) are the optimal weights and the bars represent mean values.

In a second alternative, the input matrix has to be extended with an extra column of 1s (the first column). This transforms R into a (D+1)×(D+1) matrix, which introduces a D+1 weight in the solution (the bias).

The LMS algorithm in practice.

The step size should be normalized by the variance of the input data estimated by the trace of R as follows:

$$\eta = \frac{\eta_0}{tr(R)};$$
Equation (54)

where $\eta_0$=0.1 to 0.01. The algorithm is expected to converge (settling time) in a number of iterations k given by four times the time constant of adaptation:

$$k \approx 4\tau_{mse} = \frac{2}{\eta \lambda_{min}}.$$
Equation (55)

The LMS algorithm has a miss-adjustment that is basically one half the trace of R times η:

$$M = \frac{\eta}{2} tr(R).$$
Equation (56)

When the eigenvalues are equal, the miss-adjustment can be approximated by:

$$M \approx \frac{D+1}{4\tau_{mse}}.$$
Equation (57)

Therefore, the miss-adjustment equals the number of weights divided by the settling time, or equivalently, selecting η so that it produces 10% miss-adjustment means that a training duration in iterations becomes 10 times the number of inputs.

Jaber product ($\hat{*}_{(\alpha,\gamma,\beta)}$).

For a given r×r square matrix $T_r$ and for a given column vector $x_{(n)}$ of size $N(N=r^n)$, the Jaber product is defined expressed with the operator $\hat{*}_{(\alpha,\gamma,\beta)}$ (Jaber product of radix α performed on γ column vectors of size β) by the following operation where the γ column vectors are subsets of $x_{(n)}$ picked up at a stride α:

$$X_{(k)} = \hat{*}_{(r,r,N/r)} \left( T_r, \begin{bmatrix} x_{(m)} \\ x_{(m+1)} \\ . \\ x_{(m+(r-1))} \end{bmatrix} \right)$$
Equation (58)

$$= T_r \times \begin{bmatrix} x_{(m)} \\ x_{(m+1)} \\ . \\ x_{(m+(r-1))} \end{bmatrix}$$

$$= \begin{bmatrix} T_{0,0} & T_{0,1} & . & T_{0,(r-1)} \\ T_{1,0} & T_{1,1} & . & T_{1,(r-1)} \\ . & . & . & . \\ T_{(r-1),0} & T_{(r-1),1} & . & T_{(r-1),(r-1)} \end{bmatrix} \times$$

$$col[x_{(m+j_0)}]$$

$$= \left[ \sum_{j_0=0}^{r-1} T_{(l,j_0)} x_{(m+j_0)} \right] \text{ for }$$

$$k = 0, 1, \ldots, \left(\frac{N}{R}\right) - 1 \text{ and } l = 0, 1, \ldots, r-1$$

$X_{(k)}$ is a column vector or column vectors of length γ×β in which the $l^{th}$ element $Y_l$ of the $k^{th}$ product $Y_{(l,k)}$ is labeled as:

$$l_{(k)} = l \times (\lambda \times \gamma \times \beta) + k;$$
Equation (59)

for k=0, 1, ..., (λ×β)−1 and $j_0$=0, 1, ..., r−1 and where λ is a power of r.

This is viewed as a column vector composed of r column vectors of length (λ×β) where λ is a power of r. Here the $l^{th}$ element $Y_l$ of the $k^{th}$ product $Y_{(l,k)}$ is indexed as in Equation (61).

The spatial Radix-r signal factorization.

Based on the proposition for the Jaber product, discrete signals can be decomposed into r partial signals when $T_r = I_r$ (where $I_r$ is an identity matrix). In fact, for any given discrete signal $x_{(n)}$ it can be written as follows:

$$x_{(k)} = \hat{*}_{(r,r,\frac{N}{r})}\left(I_r, \begin{bmatrix} x_{(m)} \\ x_{(m+1)} \\ \cdot \\ x_{(m+(r-1))} \end{bmatrix}\right) \quad \text{Equation (60)}$$

$$= \begin{bmatrix} 1 & 0 & \cdots & 0 \\ 0 & 1 & \cdots & 0 \\ \cdots & \cdots & \cdots & \cdots \\ 0 & 0 & \cdots & 1 \end{bmatrix} \times col[x_{(m+j_0)}];$$

which is a column vector or column vectors of length $\pi \times N$ where $\lambda(\lambda = N/r)$ is a power of $r^{-1}$ in which the $l^{th}$ element $x_l$ of the $k^{th}$ product $x_{(l,k)}$ is labeled as:

$$l_{(k)} = l \times (N/r) + k. \quad \text{Equation (61)}$$

The parallel implementation of the regression method.

The relationship between d and x stated in Equation (1) can be expressed in terms of the Jaber Product as follows:

$$d_{(n)} \approx wx_{(n)} + b = Y_{(n)} \quad \text{Equation (62)}$$

$$= w\left(\hat{*}_{(r,r,\frac{N}{r})}(I_r, col[x_{(m+j_0)}])\right) + b$$

$$= \hat{*}_{(r,r,\frac{N}{r})}(I_r, col[wx_{(m+j_0)}]) + b$$

$$= \hat{*}_{(r,r,\frac{N}{r})}(I_r, col[y_{(m+j_0)}]) + b = Y_{(n)};$$

for $j_0 = 1, \ldots, r-1$.

Figure 21:
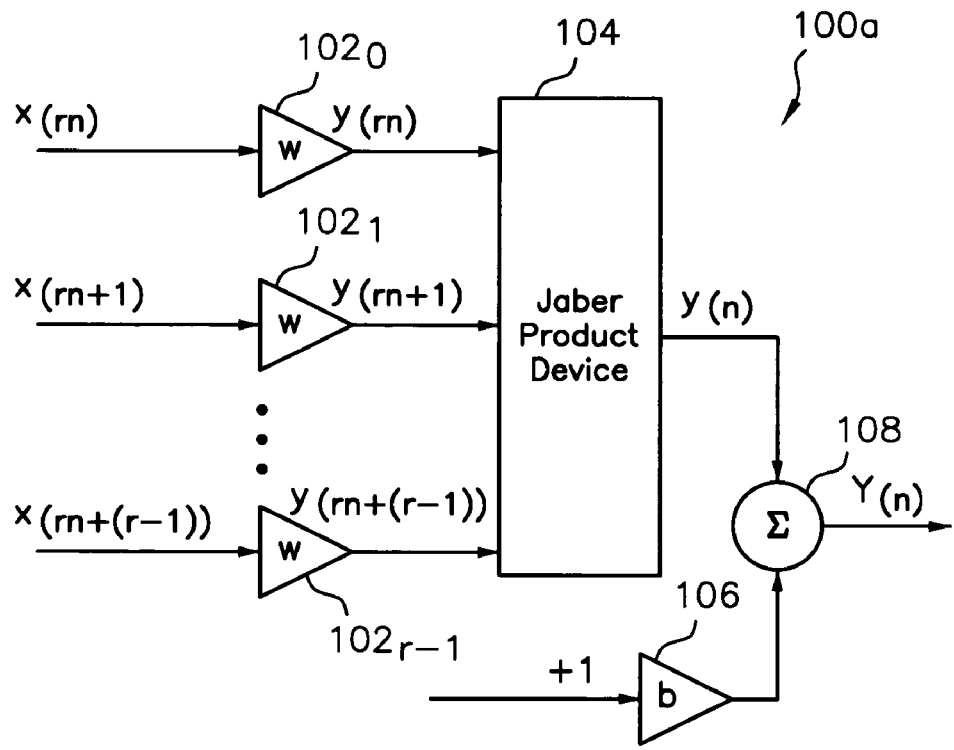
FIG. 21 is a diagram of a biased Jaber parallel processing element (BJPPE) in accordance with the present invention.
Figure 22:
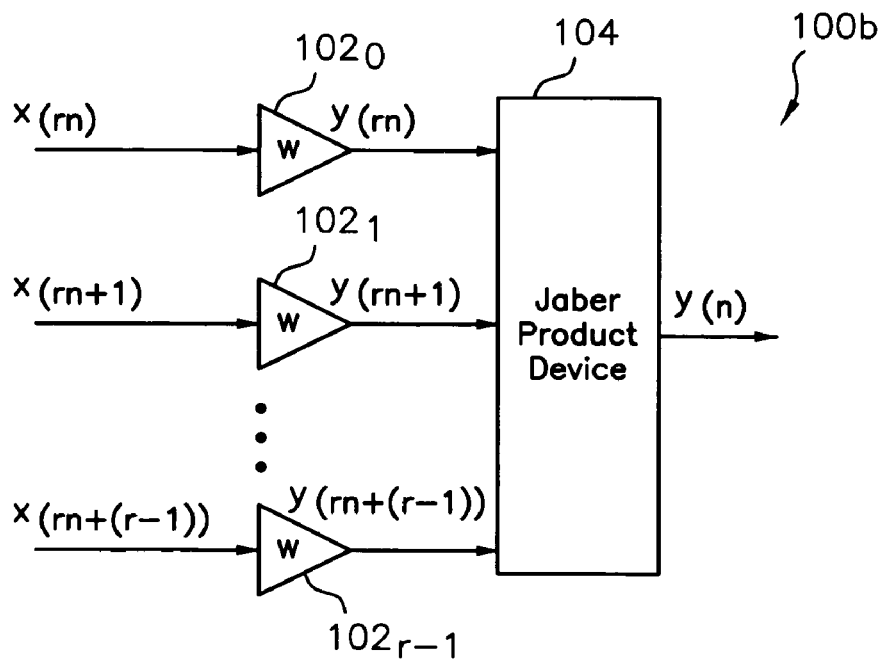
FIG. 22 is a diagram of an unbiased Jaber parallel processing element (UJPPE) in accordance with the present invention.
Figure 23:
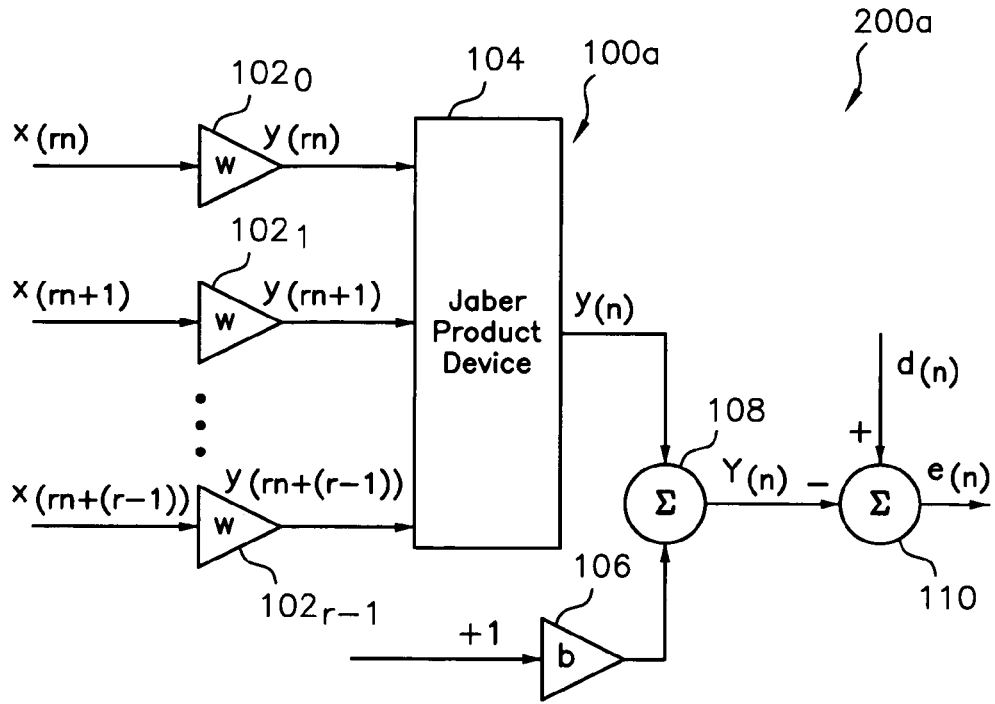
FIG. 23 is a diagram of a biased Jaber parallel linear regressor (BJPLR) in accordance with the present invention.
Figure 24:
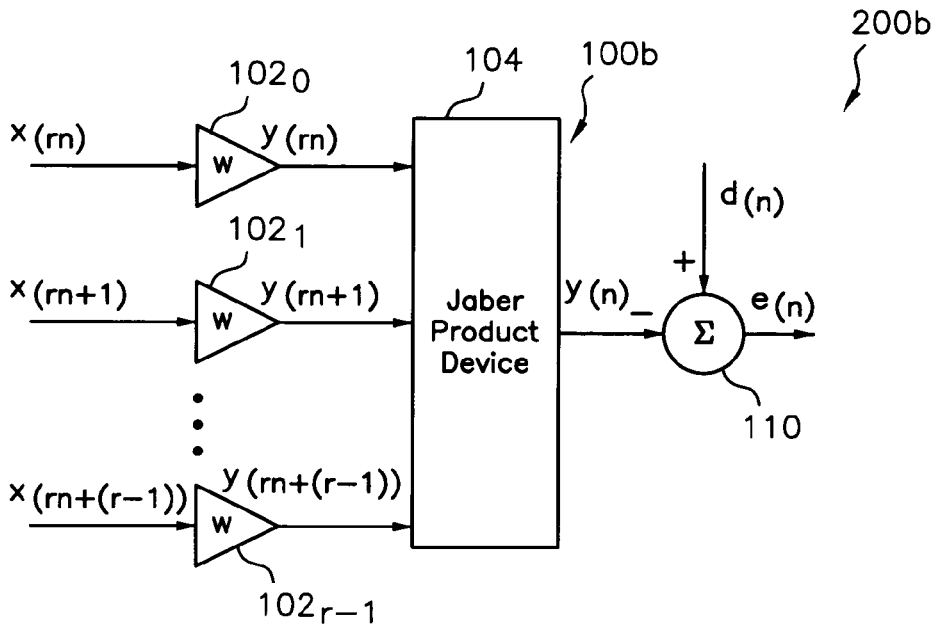
FIG. 24 is a diagram of an unbiased Jaber parallel linear regressor (UJPLR) in accordance with the present invention.

FIGS. 21 and 22 are diagrams of parallel processing elements 100a, 100b; and FIGS. 23 and 24 are diagrams of a parallel linear regressor 200a, 200b, in accordance with the present invention. The signal can be decomposed in a proper manner for parallel processing in order to speed up the process.

The parallel processing element 100a, 100b comprises a set of multiples $102_0$-$102_{r-1}$, (r multipliers in FIG. 21), and a Jaber product device 104. The processing element 100a of FIG. 21 further comprises an additional multiplier 106 and an adder 108 for bias. N input data are subdivided and each of the plurality of subdivided data enters the multipliers $102_0$-$102_{r-1}$ simultaneously. The multipliers $102_0$-$102_{r-1}$ multiply the inputs with corresponding weights and forwards multiplication outputs to the Jaber product device 104. In order to obtain the overall system driven output in a normal order (i.e for $n=0,1,\ldots$), the Jaber product device 104 rearranges the multiplication results and generates a regression output.

The parallel linear regressor 200a (or 200b) comprises a parallel processing element 100a (or 100b) and an adder 110. The parallel processing element 100a (or 100b) generates regression outputs and the outputs are compared with a desired value by the adder 110. The adder 110 subtracts the regression output from the desired value to generate error signals. The parallel linear regressor 200a, 200b in accordance with the present invention generates error signals that are in the best fitting of the input data.

Figure 25:
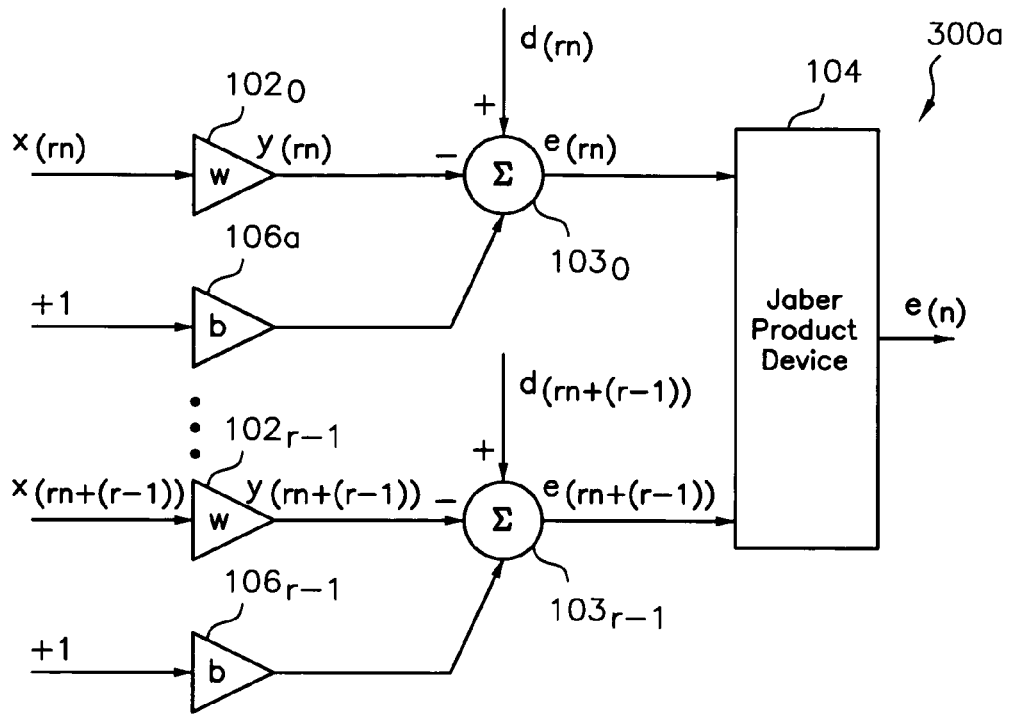
FIG. 25 is a diagram of an optimized structure of the biased Jaber parallel linear regressor in accordance with the present invention.
Figure 26:
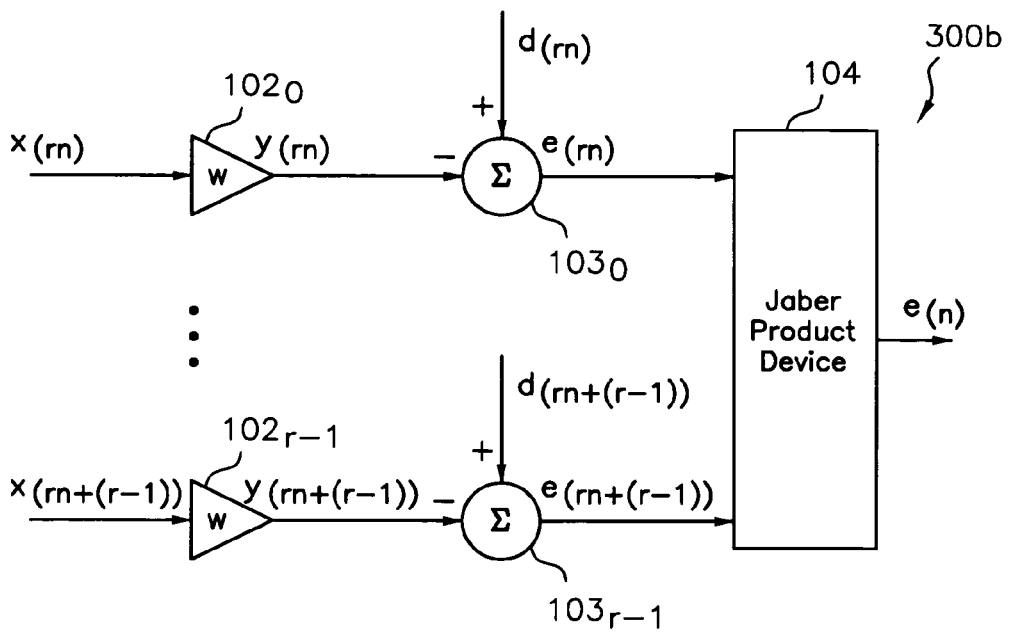
FIG. 26 is a diagram of an optimized structure of the unbiased Jaber parallel linear regressor in accordance with the present invention.
Figure 27:
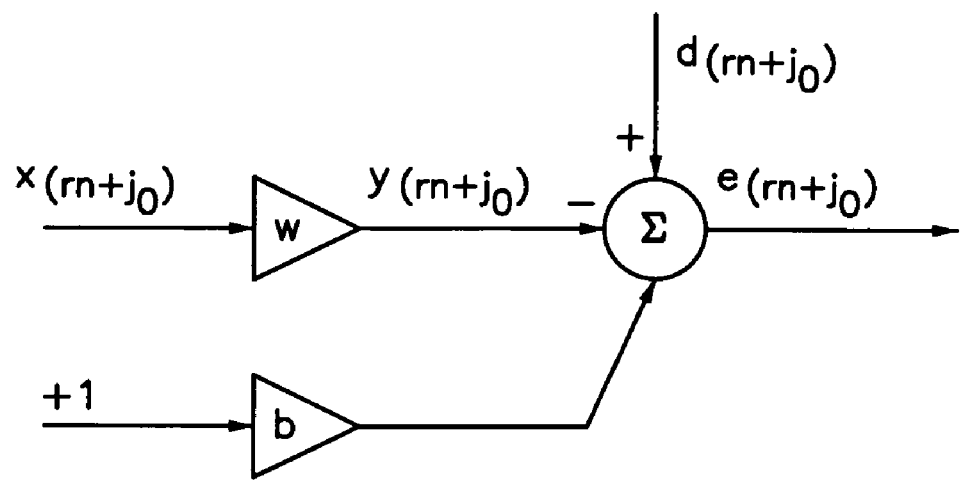
FIG. 27 is a diagram of a biased Jaber partial linear regressor in accordance with the present invention.
Figure 28:
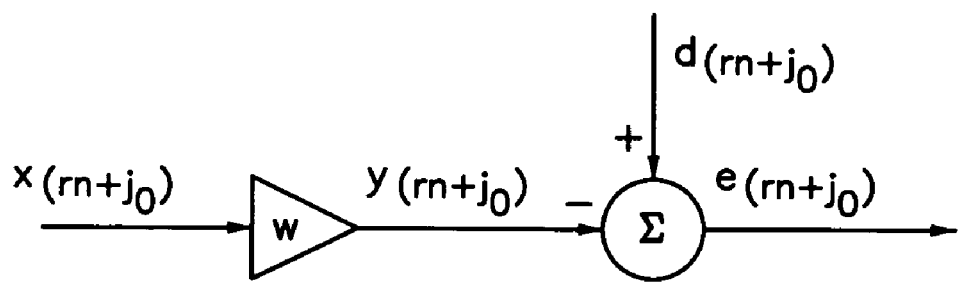
FIG. 28 is a diagram of an unbiased Jaber partial linear regressor in accordance with the present invention.

The structure of the parallel linear regressor can be optimized by manipulating Equation (2). Equation (2) can be expressed in terms of the Jaber Product as follows:

$$e_{(n)} = d_{(n)} - y_{(n)} = d_{(n)} - (wx_{(n)} + b) \quad \text{Equation (63)}$$

$$= \hat{*}_{(r,r,\frac{N}{r})}(I_r, col[d_{(m+j_0)} - y_{(m+j_0)}])$$

$$= \hat{*}_{(r,r,\frac{N}{r})}(I_r, col[d_{(m+j_0)} - (wx_{(m+j_0)} + b)])$$

$$= \hat{*}_{(r,r,\frac{N}{r})}(I_r, col[e_{(m+j_0)}])$$

for $j_0 = 1, \ldots, r-1$. FIGS. 25 and 26 are diagrams of optimized structure of the parallel linear regressor 300a, 300b. The parallel linear regressor 300a, 300b comprises a plurality of multipliers $102_0$-$102_{r-1}$, a plurality of adders $103_0$-$103_{r-1}$ and a Jaber product device 104. The multiplier $102_0$-$102_{r-1}$ multiplies the input with a corresponding weight and the adder $103_0$-$103_{r-1}$ subtracts the multiplication result from the desired value in order to generate individual error signals. The Jaber product device 104 rearranges the individual error signals from the adders $103_0$-$103_{r-1}$ and generates a final error signal for the input data. The parallel linear regressor 300a further comprises additional multipliers $106_0$-$106_{r-1}$ for bias. FIGS. 27 and 28 are diagrams of partial linear regressor which comprises the parallel linear regressor. Each result obtained from each set of data is called partial linear regression computed on a partial linear regressor.

In FIG. 23, the regression is computed on r parallel regressor and then the error is computed by subtracting the overall system output and the desired signal. In FIG. 25, the desired response is also subdivided in a proper manner like the input signal where the partial error is computed locally and the overall error system is reconstructed.

Parallel regressor for multiple variables.

Figure 29:
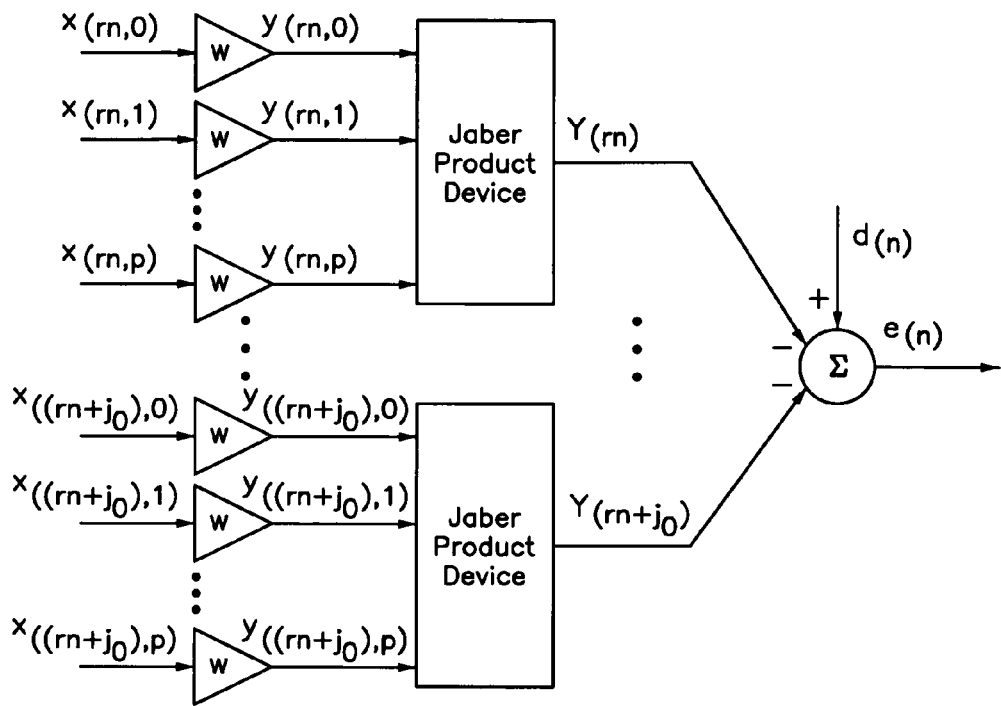
FIG. 29 is a diagram of an unbiased Jaber parallel regressor system in accordance with the present invention.
Figure 30:
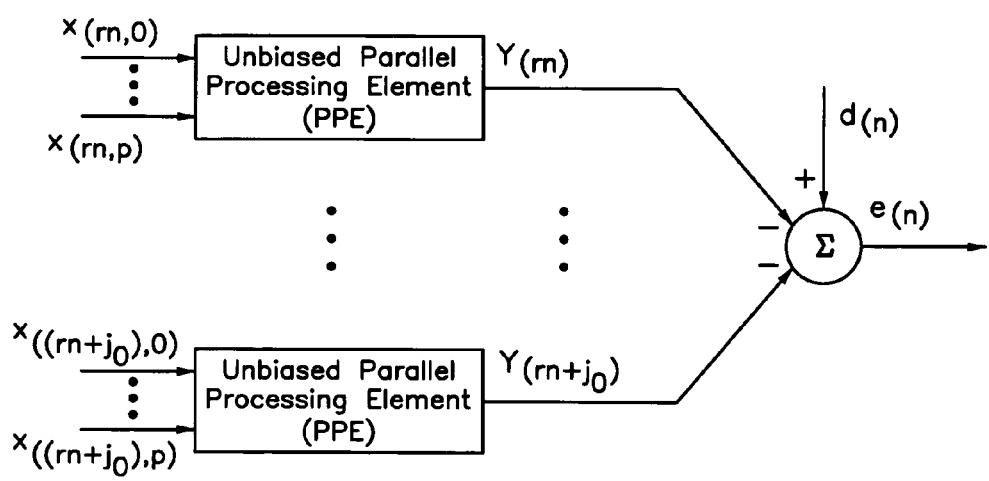
FIG. 30 is a diagram of a simplified representation of the unbiased Jaber parallel regressor system in accordance with the present invention.
Figure 31:
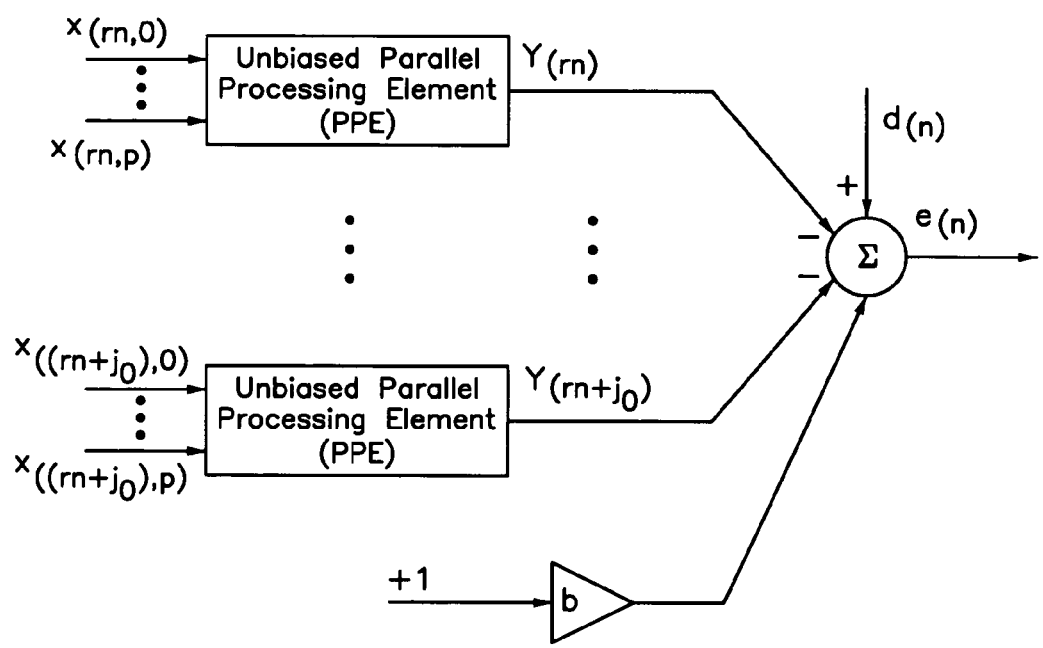
FIG. 31 is a diagram of a biased Jaber parallel regressor system in accordance with the present invention.

The relationship between d and x stated in Equation (3) for the multiple variable cases can be expressed in terms of Jaber product as follows:

$$e_{(n)} = d_{(n)} - \left(b + \sum_{k=0}^{P} w_{(k)} x_{(n,k)}\right) \quad \text{Equation (64)}$$

$$= d_{(n)} - \left(b + \sum_{k=0}^{P} \hat{*}_{(r,r,\frac{N}{r})}(I_r, col[w_{(k)} x_{((m+j_0),k)}])\right)$$

$$= d_{(n)} - \left(b + \sum_{k=0}^{P} \hat{*}_{(r,r,\frac{N}{r})}(I_r, col[y_{((m+j_0),k)}])\right)$$

$$= d_{(n)} - \left(b + \hat{*}_{(r,r,\frac{N}{r})}\left(I_r, col\left[\sum_{k=0}^{P} y_{((m+j_0),k)}\right]\right)\right) = d_{(n)} - Y_{(n)},$$

for $j_0=1, \ldots, r-1$. FIGS. 29-31 are diagrams of the parallel regressor system for multiple variable case in accordance with the present invention.

Figure 32:
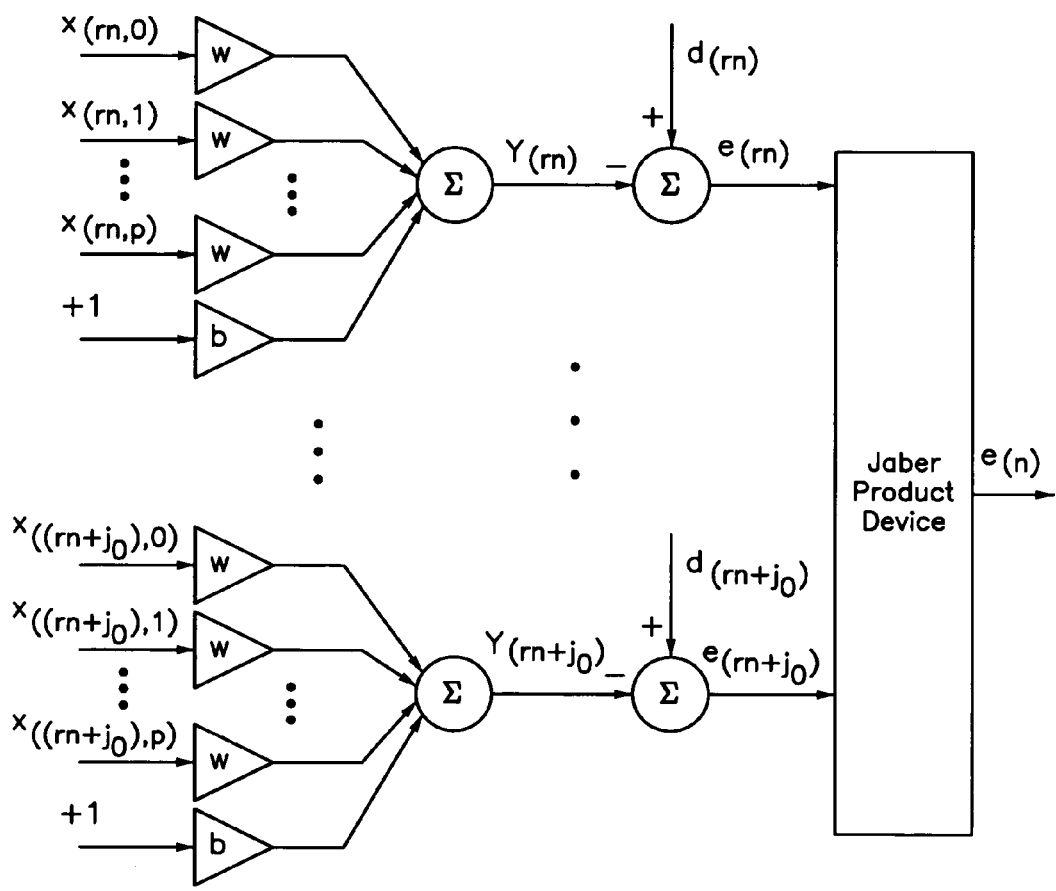
FIG. 32 is a diagram of an optimized structure of the unbiased Jaber parallel regressor system in accordance with the present invention.
Figure 33:
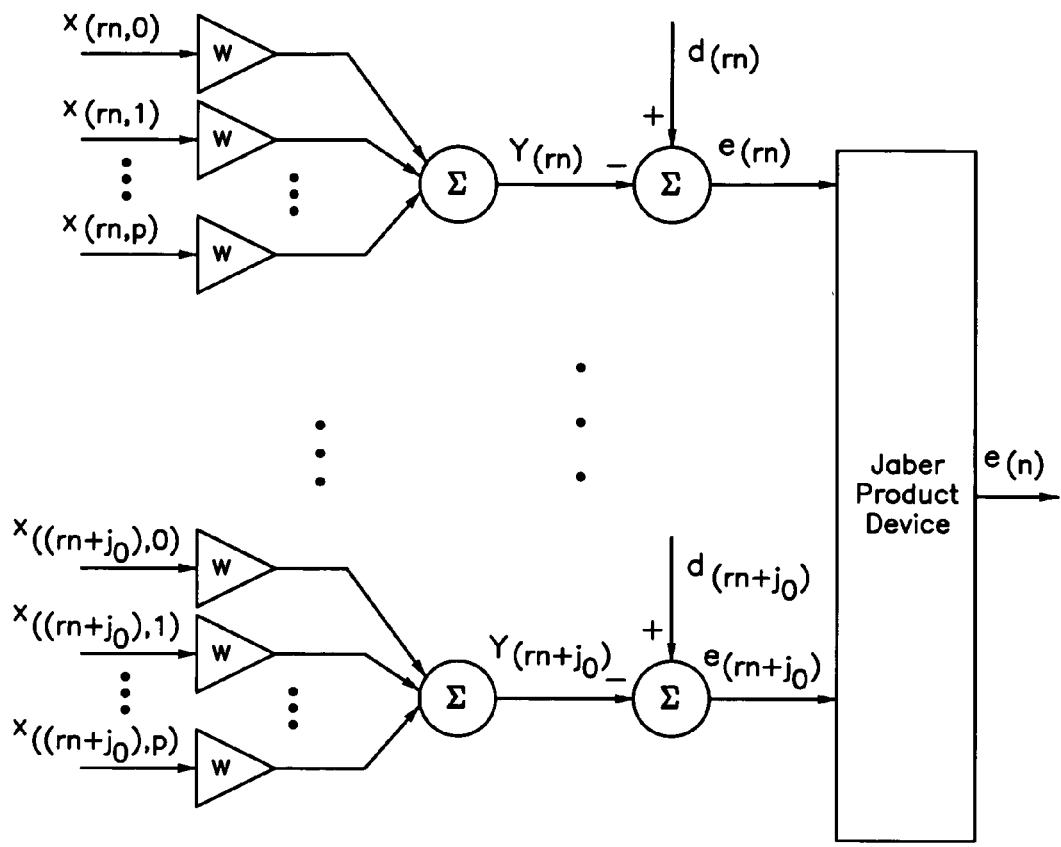
FIG. 33 is a diagram of an optimized structure of the biased Jaber parallel regressor system in accordance with the present invention.
Figure 34:
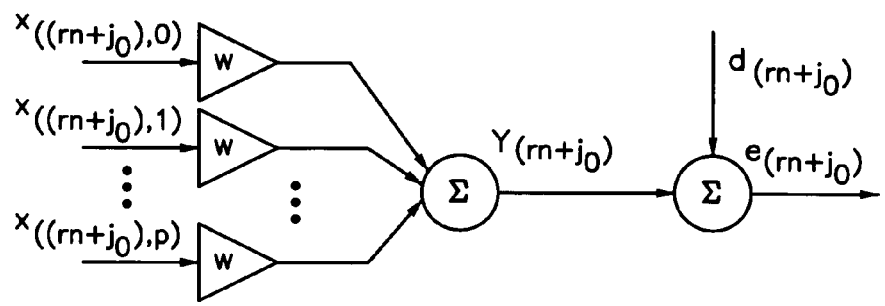
FIG. 34 is a diagram of an unbiased Jaber partial regressor system in accordance with the present invention.
Figure 35:
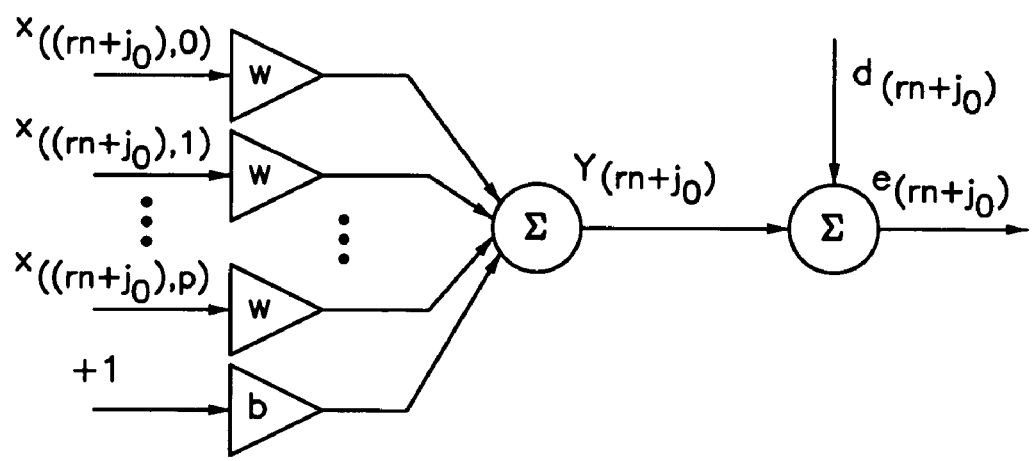
FIG. 35 is a diagram of a biased Jaber partial regressor system in accordance with the present invention.

Similarly, by expressing Equation (64) in terms of Jaber product yields to:

$$e_{(n)} = d_{(n)} - \left(b + \sum_{k=0}^{p} w_{(k)} x_{(n,k)}\right) \qquad \text{Equation (65)}$$

$$= \hat{*}_{\left(r,r,\frac{N}{r}\right)} \left(I_r, col\left[d_{(m+j_0)} - \left(b + \sum_{k=0}^{p} w_{(k)} x_{((m+j_0),k)}\right)\right]\right)$$

$$= \hat{*}_{\left(r,r,\frac{N}{r}\right)} (I_r, col[e_{(m+j_0)}])$$

for $j_0=1, \ldots, r-1$. FIGS. 32 and 33 are diagrams of the optimized structure of the parallel regressor system and FIGS. 34 and 35 are diagrams of partial regressor system in accordance with the present invention.

The parallel implementation of the least squares method.

The method of least squares assumes that the best-fit curve of a given type is the curve that has the minimal sum of the deviations squared (least square error) from a given set of data. Suppose that the N data points are $(x_0, y_0)$, $(x_1, y_1), \ldots, (x_{(n-1)}, y_{(n-1)})$, where x is the independent variable and y is the dependent variable. The fitting curve d has the deviation (error) σ from each data point, i.e., $\sigma_0 = d_0 - y_0$, $\sigma_1 = d_1 - y_1$, $\sigma_{(n-1)} = d_{(n-1)} - d_{(n-1)}$ which can be re-ordered as follows:

$$\sigma_0 = d_0 - y_0, \sigma_r = d_r - y_r, \sigma_{2r} = d_{2r} - y_{2r}, \ldots, \sigma_{rn} = d_{rn} - y_{rn},$$
$$\sigma_1 = d_1 - y_1, \ldots, \sigma_{(rn+1)} = d_{(rn+1)} - y_{(rn+1)}, \ldots,$$
$$\sigma_{(rn+(r-1))} = d_{(rn+(r-1))} - y_{(rn+(r-1))} \qquad \text{Equation (66)}$$

for $n=0, 1, \ldots, (N/r)-1$.

According to the method of least squares, the best fitting curve has the property that:

$$J = \sigma_0^2 + \ldots + \sigma_{rn}^2 + \sigma_1^2 + \ldots + \sigma_{(rn+1)}^2 + \ldots + \sigma_{(rn+(r-1))}^2 \qquad \text{Equation (67)}$$

$$= \sum_{j_0=0}^{r-1} \sum_{n=0}^{(\frac{N}{r})-1} [d_{(m+j_0)} - y_{(m+j_0)}]^2$$

$$= \sum_{j_0=0}^{r-1} \sum_{n=0}^{(\frac{N}{r})-1} \sigma_{(m+j_0)}^2 = a \text{ minimum}$$

It has been shown that Equation (5) can be expanded in terms of Jaber product as follows:

$$e_{(n)} = d_{(n)} - (b + wx_{(n)}) = d_{(n)} - y_{(n)} \qquad ; \quad \text{Equation (68)}$$
$$= \hat{*}_{\left(r,r,\frac{N}{r}\right)} (I_r, col[d_{(m+j_0)} - (b + wx_{(m+j_0)})])$$
$$= \hat{*}_{\left(r,r,\frac{N}{r}\right)} (I_r, col[d_{(m+j_0)} - y_{(m+j_0)}]) =$$
$$\hat{*}_{\left(r,r,\frac{N}{r}\right)} (I_r, col[e_{(m+j_0)}])$$

for $j_0=1, \ldots, r-1$ and in order to pick the line which best fits the data, MSE is utilized as a performance criterion.

$$J = \frac{1}{2N} \sum_{n=0}^{N-1} e_{(n)}^2 = \qquad \text{Equation (69)}$$

$$\frac{1}{2N} \sum_{j_0=0}^{r-1} \sum_{n=0}^{(\frac{N}{r})-1} \left(\hat{*}_{\left(r,r,\frac{N}{r}\right)} (I_r, col[e_{(m+j_0)}])\right)^2$$

$$= \left(\frac{1}{r}\right) \sum_{j_0=0}^{r-1} \left(\frac{1}{2\left(\frac{N}{r}\right)}\right)$$

$$\sum_{n=0}^{(\frac{N}{r})-1} \left(\hat{*}_{\left(r,r,\frac{N}{r}\right)} (I_r, col[e_{(m+j_0)}])\right)^2$$

$$= \left(\frac{1}{r}\right) \sum_{j_0=0}^{r-1} (\hat{*})_{\left(r,r,\frac{N}{r}\right)}$$

$$\left(I_r, col\left[\left(\frac{1}{2\left(\frac{N}{r}\right)}\right) \sum_{n=0}^{(\frac{N}{r})-1} e_{(m+j_0)}^2\right]\right) =$$

$$\left(\frac{1}{r}\right) \sum_{j_0=0}^{r-1} (\hat{*})_{\left(r,r,\frac{N}{r}\right)} (I_r, col[J_{j_0}]) = \left(\frac{1}{r}\right) \sum_{j_0=0}^{r-1}$$

where $J_{j_0}$ is the partial MSE applied on the subdivided data.

The goal is to minimize J analytically, which can be done by taking its partial derivative with respect to the unknowns and equating the resulting equations to zero as follows:

$$\begin{cases} \frac{\partial J}{\partial b} = 0 \\ \frac{\partial J}{\partial w} = 0 \end{cases} ; \qquad \text{Equation (70)}$$

which yields:

$$\begin{cases} \dfrac{\partial J}{\partial b} = \dfrac{\partial\left(\left(\dfrac{1}{r}\right)\sum_{j_0=0}^{r-1} \hat{*}_{(r,r,\frac{N}{r})}(I_r, col[J_{j_0}])\right)}{\partial b} = \left(\dfrac{1}{r}\right)\sum_{j_0=0}^{r-1} \hat{*}_{(r,r,\frac{N}{r})}\left(I_r, col\left[\dfrac{\partial(J_{j_0})}{\partial b}\right]\right) = \left(\dfrac{1}{r}\right)\sum_{j_0=0}^{r-1} \dfrac{\partial(J_{j_0})}{\partial b} = 0 \\ \dfrac{\partial J}{\partial b} = \dfrac{\partial\left(\left(\dfrac{1}{r}\right)\sum_{j_0=0}^{r-1} \hat{*}_{(r,r,\frac{N}{r})}(I_r, col[J_{j_0}])\right)}{\partial w} = \left(\dfrac{1}{r}\right)\sum_{j_0=0}^{r-1} \hat{*}_{(r,r,\frac{N}{r})}\left(I_r, col\left[\dfrac{\partial(J_{j_0})}{\partial w}\right]\right) = \left(\dfrac{1}{r}\right)\sum_{j_0=0}^{r-1} \dfrac{\partial(J_{j_0})}{\partial w} = 0 \end{cases}$$

Equation (71)

$$\begin{cases} \dfrac{\partial J}{\partial b} = \left(\dfrac{1}{r}\right)\sum_{j_0=0}^{r-1} \hat{*}_{(r,r,\frac{N}{r})}\left(I_r, col\left[\dfrac{\partial\left(\left(\dfrac{1}{2\left(\frac{N}{r}\right)}\right)\sum_{n=0}^{(\frac{N}{r})-1}(d_{(m+j_0)} - (b+wx_{(m+j_0)}))^2\right)}{\partial b}\right]\right) = 0 \\ \dfrac{\partial J}{\partial w} = \left(\dfrac{1}{r}\right)\sum_{j_0=0}^{r-1} (\hat{*})_{(r,r,\frac{N}{r})}\left(I_r, col\left[\dfrac{\partial\left(\left(\dfrac{1}{2\left(\frac{N}{r}\right)}\right)\sum_{n=0}^{(\frac{N}{r})-1}(d_{(m+j_0)} - (b+wx_{(m+j_0)}))^2\right)}{\partial w}\right]\right) = 0 \end{cases}$$

Equation (72)

Therefore, $$\begin{cases} -\dfrac{1}{r}\sum_{j_0=0}^{r-1}\sum_{n=0}^{(\frac{N}{r})-1}\left(\dfrac{1}{\left(\frac{N}{r}\right)}\right)(d_{(m+j_0)} - (b+wx_{(m+j_0)})) = 0 \\ \dfrac{1}{r}\sum_{j_0=0}^{r-1}\sum_{n=0}^{(\frac{N}{r})-1}\left(\dfrac{1}{\left(\frac{N}{r}\right)}\right)(d_{(m+j_0)} - (b+wx_{(m+j_0)}))x_{(m+j_0)} = 0 \end{cases}$$

Equation (73)

which yields:

$$\sum_{j_0=0}^{r-1}\sum_{n=0}^{(\frac{N}{r})-1} d_{(m+j_0)} = Nb + w\sum_{j_0=0}^{r-1}\sum_{n=0}^{(\frac{N}{r})-1} x_{(m+j_0)}$$

$$\sum_{j_0=0}^{r-1}\sum_{n=0}^{(\frac{N}{r})-1} d_{(m+j_0)}x_{(m+j_0)} = b\sum_{j_0=0}^{r-1}\sum_{n=0}^{(\frac{N}{r})-1} x_{(m+j_0)} + w\sum_{j_0=0}^{r-1}\sum_{n=0}^{(\frac{N}{r})-1} x_{(m+j_0)}^2$$

Equation (74)

The set of Equation (74) is called the normal equations. The solution of this set of equations is:

$$b = \dfrac{\sum_{j_0=0}^{r-1}\sum_{n=0}^{(\frac{N}{r})-1}(x_{(m+j_0)})^2 \sum_{j_0=0}^{r-1}\sum_{n=0}^{(\frac{N}{r})-1} y_{(m+j_0)} - \sum_{j_0=0}^{r-1}\sum_{n=0}^{(\frac{N}{r})-1} x_{(m+j_0)}\sum_{j_0=0}^{r-1}\sum_{n=0}^{(\frac{N}{r})-1} x_{(m+j_0)}d_{(m+j_0)}}{N\sum_{j_0=0}^{r-1}\sum_{n=0}^{(\frac{N}{r})-1}(x_{(m+j_0)} - \bar{x}_{(m+j_0)})}$$

Equation (75)

which yields after simplification to:

$$b = \frac{1}{r}\sum_{j_0=0}^{r-1}\left\{\frac{\sum_{n=0}^{(\frac{N}{r})-1}(x_{(m+j_0)})^2 \sum_{n=0}^{(\frac{N}{r})-1} y_{(m+j_0)} - \sum_{n=0}^{(\frac{N}{r})-1} x_{(m+j_0)} \sum_{n=0}^{(\frac{N}{r})-1} x_{(m+j_0)} d_{(m+j_0)}}{\left(\frac{N}{r}\right)\sum_{n=0}^{(\frac{N}{r})-1}(x_{(m+j_0)} - \overline{x}_{(m+j_0)})}\right\} = \frac{1}{r}\sum_{j_0=0}^{r-1} b_{j_0} \qquad \text{Equation (76)}$$

for $j_0=1, \ldots, r-1$. With the same analogy the second unknown is computed to obtain:

$$w = \frac{1}{r}\sum_{j_0=0}^{r-1} w_{j_0}; \qquad \text{Equation (77)}$$

where $b_{j_0}$ and $w_{j_0}$ are the solutions of the partial least square applied on the decomposed data.

The parallel implementation of the least squares for multiple variable case.

The MSE of Equation (9) after being expanded in terms of Jaber product becomes:

$$J = \frac{1}{2N}\sum_{n=0}^{N-1}\left(d_{(n)} - \sum_{k=0}^{p} w_{(k)} x_{(n,k)}\right)^2 \qquad \text{Equation (78)}$$

$$= \frac{1}{r}\sum_{j_0=0}^{r-1}\sum_{n=0}^{(\frac{N}{r})-1}\left(\frac{1}{\frac{N}{r}}\right)\left(\hat{*}_{(r,r,\frac{N}{r})}\left(I_r, col\left[d_{(m+j_0)} - \sum_{k=0}^{p} w_{((m+j_0),k)} x_{((m+j_0),k)}\right]\right)\right)^2$$

$$= \frac{1}{r}\left(\sum_{j_0=0}^{r-1}\sum_{n=0}^{(\frac{N}{r})-1}\frac{1}{\frac{N}{r}}\left[d_{(m+j_0)} - \sum_{k=0}^{p} w_{((m+j_0),k)} x_{((m+j_0),k)}\right]^2\right)$$

$$= \frac{1}{r}\sum_{j_0=0}^{r-1} J_{j_0}$$

for $j_0=1, \ldots, r-1$ and where $J_{j_0}$ is the partial MSE applied on the subdivided data.

The solution to the extreme (minimum) of this equation can be found in exactly the same way as before. By taking the derivatives of J with respect to the unknowns $(w_{(k)})$, and equating the result to zero. This yields a set of p+1 equations in p+1 unknowns called normal equations.

$$\sum_{j_0=0}^{r-1}\sum_{n=0}^{(\frac{N}{r})-1} x_{((m+j_0),j)} d_{((m+j_0))} = \sum_{j_0=0}^{r-1}\sum_{k=0}^{p} w_{(k)} \sum_{n=0}^{(\frac{N}{r})-1} x_{((m+j_0),k)} x_{((m+j_0),j)}; \qquad \text{Equation (79)}$$

for $j=0, 1, \ldots, p$.

Parallel Correlation Coefficient.

It is necessarily to calculate a measure of how successfully the regression line represents the relationship between x and d. The size of the MSE (J) can be used to determine which line best fits the data, but it doesn't necessarily reflect whether a line fits the data at all. The size of the MSE is dependent upon the number of data samples and the magnitude (or power) of the data samples. For instance, by simply scaling the data, the MSE can be changed without changing how well the data is fit by the regression line. The correlation coefficient (c) solves this problem by comparing the variance of the predicted value with the variance of the desired value. The value $c^2$ represents the amount of variance in the data captured by the linear regression:

$$c^2 = \frac{\sum_n (y_{(n)} - \overline{d})^2}{\sum_n (d_{(n)} - \overline{d})^2} \qquad \text{Equation (80)}$$

$$= \frac{\sum_{j_0=0}^{r-1}\sum_{n=0}^{(\frac{N}{r})-1} \hat{*}_{(r,r,\frac{N}{r})}\left(I_r, col\left[(y_{(m+j_0)} - \overline{d}_{(m+j_0)})^2\right]\right)}{\sum_{j_0=0}^{r-1}\sum_{n=0}^{(\frac{N}{r})-1} \hat{*}_{(r,r,\frac{N}{r})}\left(I_r, col\left[(d_{(m+j_0)} - \overline{d}_{(m+j_0)})^2\right]\right)}$$

$$= \frac{1}{r}\sum_{j_0=0}^{r-1} \frac{\sum_{n=0}^{(\frac{N}{r})-1} \hat{*}_{(r,r,\frac{N}{r})}\left(I_r, col\left[(y_{(m+j_0)} - \overline{d}_{(m+j_0)})^2\right]\right)}{\sum_{n=0}^{(\frac{N}{r})-1} \hat{*}_{(r,r,\frac{N}{r})}\left(I_r, col\left[(d_{(m+j_0)} - \overline{d}_{(m+j_0)})^2\right]\right)}$$

$$= \frac{1}{r}\sum_{j_0=0}^{r-1} c_{j_0}^2$$

If $y_{(n)}$ is substituted by the equation of the regression line and operate, a correlation coefficient is obtained as follows:

$$c = \frac{\frac{\sum_n (x_{(n)} - \bar{x})(d_{(n)} - \bar{d})}{N}}{\sqrt{\frac{\sum_n (d_{(n)} - \bar{d})^2}{N}} \sqrt{\frac{\sum_n (x_{(n)} - \bar{x})^2}{N}}}$$

$$= \left(\frac{1}{r}\right) \frac{\sum_{j_0=0}^{r-1} \sum_{n=0}^{(\frac{N}{r})-1} \hat{*}_{(r,r,\frac{N}{r})}(I_r, col[(x_{(m+j_0)} - \bar{x}_{(m+j_0)})(d_{(m+j_0)} - \bar{d}_{(m+j_0)})])}{\sqrt{\frac{\sum_{j_0=0}^{r-1} \sum_{n=0}^{(\frac{N}{r})-1} \hat{*}_{(r,r,\frac{N}{r})}(I_r, col[(d_{(m+j_0)} - \bar{d}_{(m+j_0)})^2])}{N}} \sqrt{\frac{\sum_{j_0=0}^{r-1} \sum_{n=0}^{(\frac{N}{r})-1} \hat{*}_{(r,r,\frac{N}{r})}(I_r, col[(x_{(m+j_0)} - \bar{x}_{(m+j_0)})^2])}{N}}}$$

$$= \left(\frac{1}{r}\right) \sum_{j_0=0}^{r-1} \frac{\sum_{n=0}^{(\frac{N}{r})-1} \hat{*}_{(r,r,\frac{N}{r})}(I_r, col[(x_{(m+j_0)} - \bar{x}_{(m+j_0)})(d_{(m+j_0)} - \bar{d}_{(m+j_0)})])}{\sqrt{\frac{\sum_{n=0}^{(\frac{N}{r})-1} \hat{*}_{(r,r,\frac{N}{r})}(I_r, col[(d_{(m+j_0)} - \bar{d}_{(m+j_0)})^2])}{N}} \sqrt{\frac{\sum_{n=0}^{(\frac{N}{r})-1} \hat{*}_{(r,r,\frac{N}{r})}(I_r, col[(x_{(m+j_0)} - \bar{x}_{(m+j_0)})^2])}{N}}}$$

$$= \left(\frac{1}{r}\right) \sum_{j_0=0}^{r-1} c_{j_0}$$

Equation (81)

The numerator is the partial covariance of the two variables, and the denominator is the product of the corresponding partial standard deviations. The correlation coefficient is confined to the range [−1, 1]. When c=1 there is a perfect positive correlation between x and d, (i.e. they co-vary). When c=−1, there is a perfect negative correlation between x and d, (i.e. they vary in opposite ways, so that when x increases, y decreases). When c=0 there is no correlation between x and d, (i.e. the variables are called uncorrelated). Intermediate values describe partial correlations.

Parallel Correlation Coefficient for Multiple Variables.

The method of least squares is very powerful. Estimation theory says that the least square estimator is the "best linear unbiased estimator" (BLUE), since it has no bias and minimizes the variance. It can be generalized to higher order polynomial curves such as quadratics, cubic, etc. (the generalized least squares). In this case, nonlinear regression models are obtained and more coefficients need to be computed but the methodology still applies. Regression can also be extended to multiple variables, where the dependence of d is not a single variable x, but a vector $X=[x_1, \ldots, x_p]^T$, where T means the transpose and vectors are denoted by capital letters. In this case the regression line becomes a hyper-plane in the space $x_1, x_2, \ldots, x_p$. The autocorrelation of the input samples for indices k, j is defined as follows:

$$R_{(n,j)} = \frac{1}{N} \sum_n x_{(n,k)} x_{(n,j)}$$

$$= \frac{1}{r} \sum_{j_0=0}^{r-1} \frac{1}{\left(\frac{N}{r}\right)} \sum_{n=0}^{(\frac{N}{r})-1} \hat{*}_{(r,r,\frac{N}{r})}(I_r, col[(x_{(m+j_0,k)} - \bar{x}_{(m+k)})])$$

$$= \frac{1}{r} \sum_{j_0=0}^{r-1} R_{j_{0(n,j)}}.$$

Equation (82)

Knowing that the autocorrelation measures similarity across the input samples, when k=j, R is just the sum of the squares of the input samples (the power in the data). When k differs from j, R measures the sum of the cross-products for every possible combination of the indices. Thus, information about the structure of the data set is obtained as follows:

$$P_{(j)} = \frac{1}{N} \sum_n x_{(n,j)} d_{(n)}$$

Equation (83)

-continued $$= \frac{1}{r}\sum_{j_0=0}^{r-1}\frac{1}{\left(\frac{N}{r}\right)}\sum_{n=0}^{(\frac{N}{r})-1} x_{(m+j_0,j)}d_{(m+j_0)}$$

$$= \frac{1}{r}\sum_{j_0=0}^{r-1} P_{j_0(j)}.$$

Parallel Least Squares as a Search for the Parameters of a Parallel Linear System.

The purpose of least squares is to find parameters (b, $w_1$, $w_2$, ..., $w_p$) that minimize the difference between the system output $y_{(n)}$ and the desired response $d_{(n)}$. So, regression is effectively computing the optimal parameters of an interpolating system which predicts the value of d from the value of x.

Figure 40:
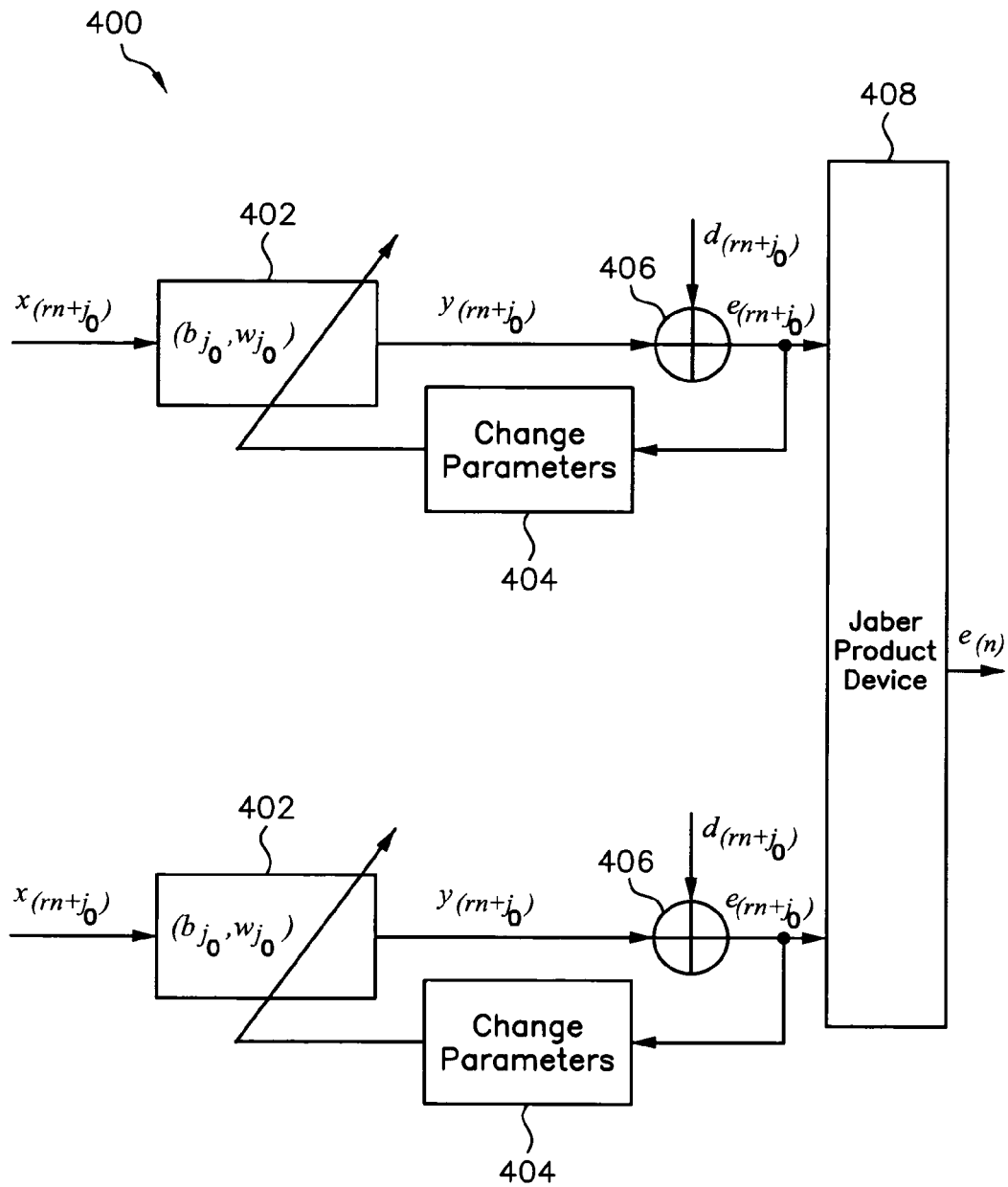
FIG. 40 is a diagram of a parallel regression processor in accordance with the present invention.

FIG. 10 shows graphically the operation of adapting the parameters of the linear system. The system output y is always a linear combination of the input x with the bias, so it has to lie on a straight line of equation y=wx+b. Changing b modifies the y intersect, while changing w modifies the slope. The goal of the parallel linear regression is to adjust the position of the set of line such that the average square difference between the $y_{(rn+j_0)}$ values (on the line) and the cloud of points $d_{(rn+j_0)}$ i.e. the error $e_{(rn+j_0)}$, is minimized. The key point is to recognize that the error contains information which can be used to optimally place the line. FIG. 40 shows this by including a subsystem which accepts the error and modifies the parameters of the system. Thus, the error $e_{(rn+j_0)}$ is fedback to the system and indirectly affects the output through a change in the parameters ($b_{j_0}$, $w_{j_0}$). Effectively the system is made "aware" of its performance through the error. With the incorporation of the mechanism that automatically modifies the system parameters, a very powerful linear system can be built that will constantly seek optimal parameters. Such systems are called Adaptive systems, and are the focus of the present invention.

The apparatus 400 in FIG. 40 comprises a plurality of adaptive filters 402, feedback networks 404, a plurality of subtractors 406 and a Jaber product device 408. Each of the plurality of adaptive filters 402 processes each of subdivided input data and the subtractors subtracts the filtering outputs from the desired results, respectively. The error signal is used by the feedback networks 404 for adjusting coefficients of the adaptive filters 402. The Jaber product device 408 rearranges the error signals to generate a final error output.

The r one-dimensional parallel LMS algorithm.

Based on Equation (69), Equation (30) can be formulated as:

$$\nabla J_{(k)} = \nabla \left(\frac{1}{r}\sum_{j_0=0}^{r-1} \ast_{(r,r,\frac{N}{r})}(I_r, col[J_{j_0(k)}])\right) \quad \text{Equation (84)}$$

$$= \frac{\partial}{\partial w} J_{(k)}$$

$$= \frac{\partial}{\partial w}\left(\frac{1}{r}\sum_{j_0=0}^{r-1} \ast_{(r,r,\frac{N}{r})}(I_r, col[J_{j_0(k)}])\right)$$

$$\approx \frac{\partial}{\partial w}\frac{1}{2Nr}\sum e^2$$

-continued $$= \frac{\partial}{\partial w}\frac{1}{2Nr}\sum_{j_0=0}^{r-1}\sum_{n=0}^{(\frac{N}{r})-1}(\ast_{(r,r,\frac{N}{r})}(I_r, col[e_{(m+j_0)}]))^2$$

$$\approx \frac{1}{r}\frac{\partial}{\partial w}\left(\ast_{(r,r,\frac{N}{r})}(I_r, col[e^2_{(m+j_0)(k)}x_{(m+j_0)(k)}])\right).$$

If the estimator of Equation (30) is substituted in Equation (29), the steepest descent equation becomes:

$$\ast_{(r,r,\frac{N}{r})}(I_r, col[w_{j_0(k+1)}]) = \ast_{(r,r,\frac{N}{r})} \quad \text{Equation (85)}$$

$$\left(I_r, col\left[(w_{j_0(k)}) + \left(\left(\frac{1}{r}\right)(\eta_{j_0} e_{(m+j_0)(k)} x_{(m+j_0)(k)})\right)\right]\right);$$

for $j_0 = 0, 1, ..., r-1$.

Figure 36:
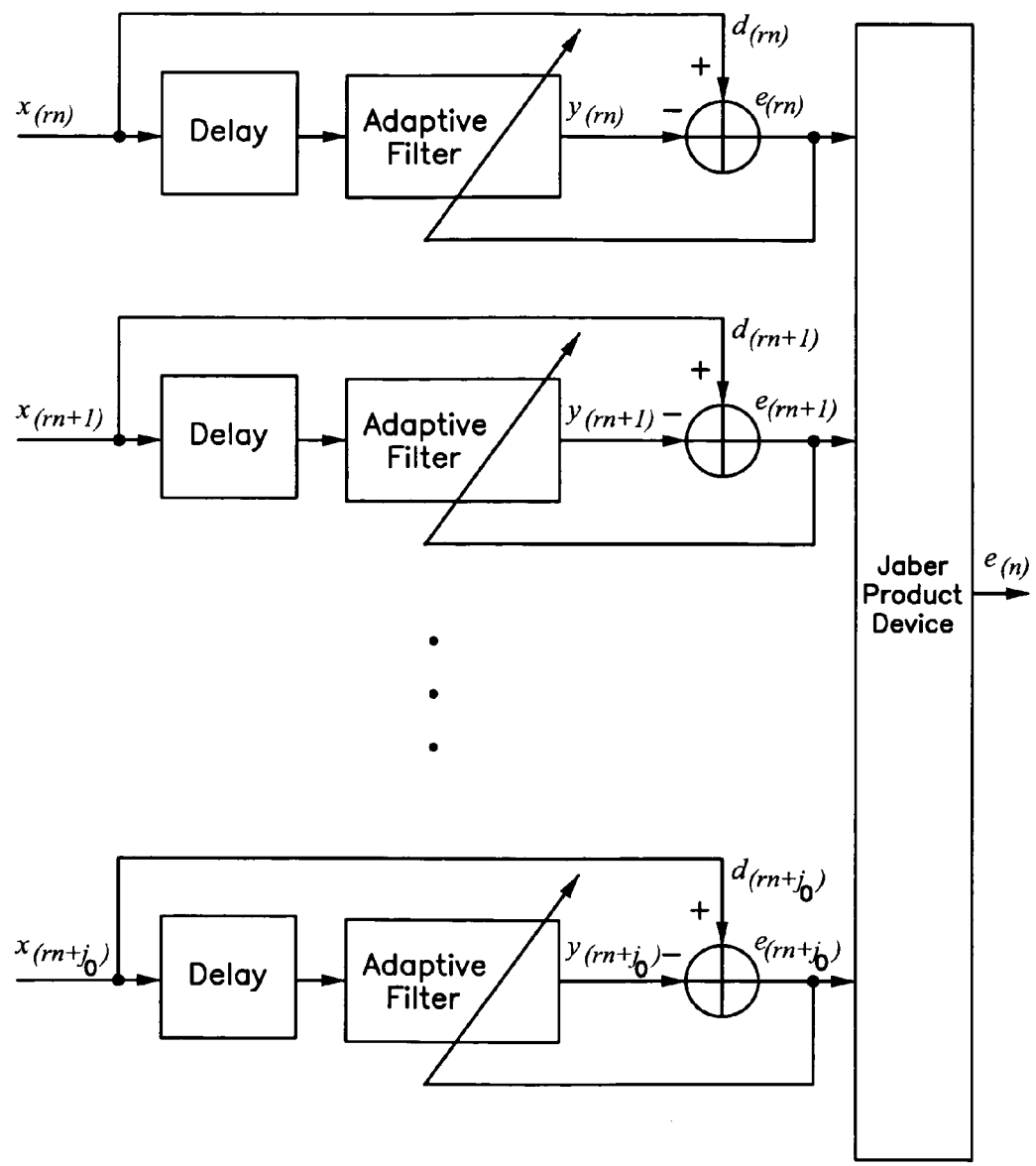
FIG. 36 is a diagram of a predictive filter implementing an r parallel LMS algorithm in accordance with the present invention.

This equation is the r parallel LMS algorithm, which is used as predictive filter, as illustrated in FIG. 36. With the LMS rule one does not need to worry about perturbation and averaging to properly estimate the gradient during each iteration, it is the iterative process that improves the gradient estimator. The small constant η is called the step size or the learning rate.

The function of the predictive adaptive filter is to provide the best prediction (in some sense) of the present value of a random signal. The present value of the signal thus serves the purpose of a desired response for the adaptive filter. Past values of the signal supply the input applied to the adaptive filter. Depending on the application of interest, the adaptive filter output or estimation (prediction) error may serve as the system output. In the first case, the system operates as a predictor; in the latter case, it operates as a prediction-error filter. This configuration could be used to enhance a sinusoid in broadband noise figure (42).

Figure 37:
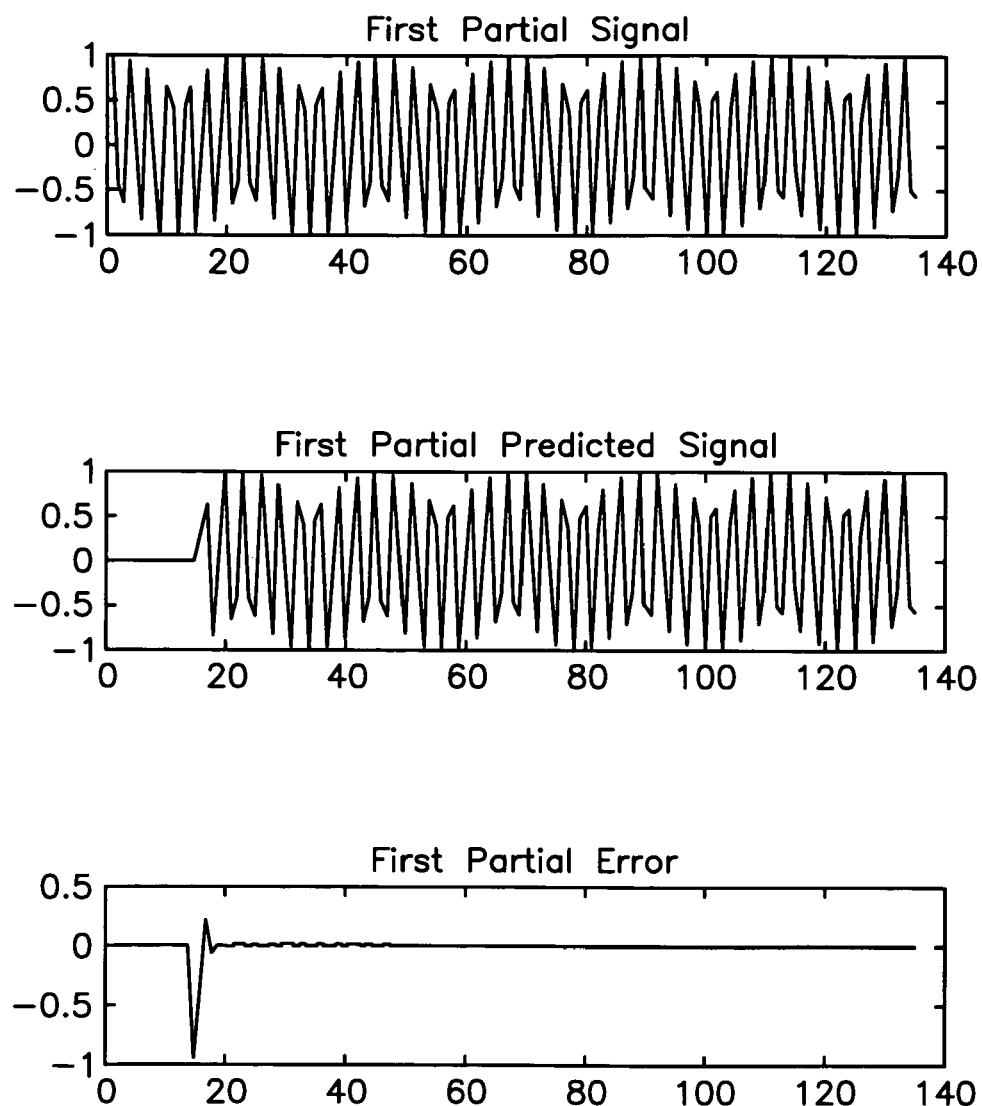
FIGS. 37-39 show simulation result of the filter of FIG. 36 in accordance with the present invention.
Figure 38:
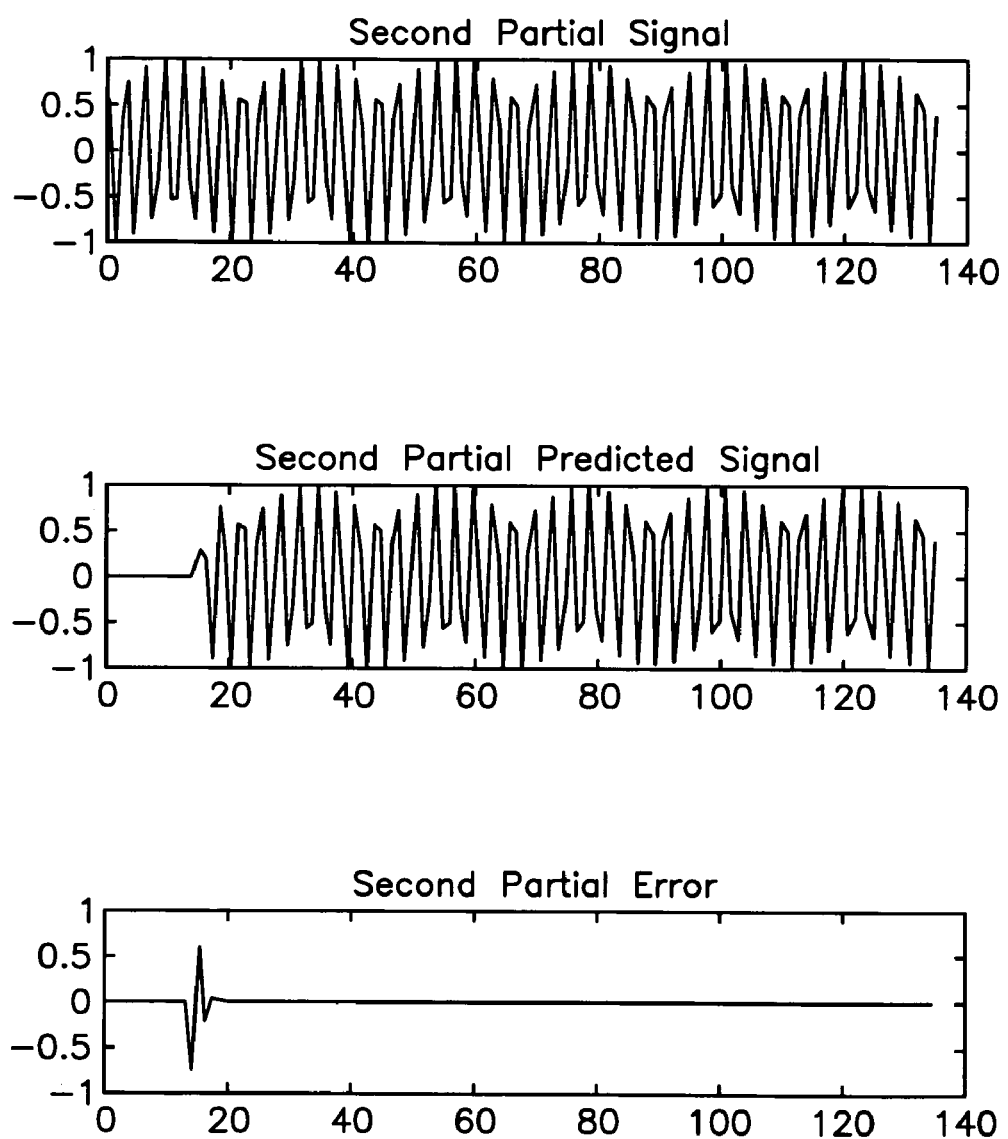
Figure 39:
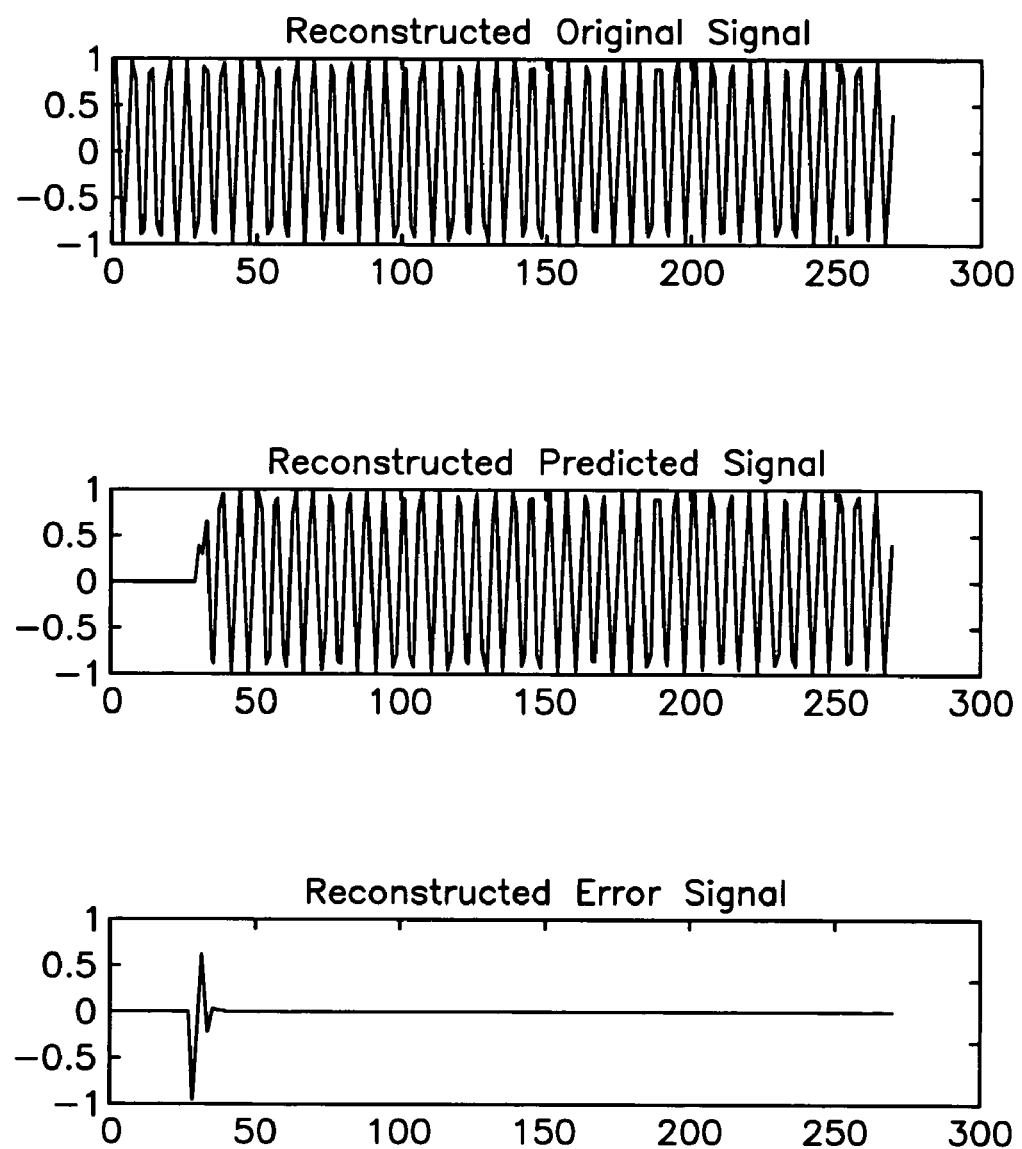

FIGS. 37-39 are simulation results of the partial LMS algorithm and the overall system. In the simulaslation a signal of size 256 (N=256) is predicted. The data is subdivided into odd and even data and then two predictive filters are used in parallel in order to predict the signal in each set of data and then the final result is obtained by rearranging the data through Jaber product device into a normal order.

Although the features and elements of the present invention are described in the preferred embodiments in particular combinations, each feature or element can be used alone without the other features and elements of the preferred embodiments or in various combinations with or without other features and elements of the present invention.

What is claimed is:

1. An apparatus for performing linear regression of input data, the apparatus comprising:
 a plurality of multipliers for multiplying each of a plurality of subdivided input data picked up at a stride r with a corresponding weight, respectively, to generate partial linear regression outputs;
 a Jaber product device for rearranging the partial linear regression outputs and generating a linear regression output; and
 a subtractor for subtracting the linear regression output from a desired result to generate an error of a linear regression model.

2. The apparatus of claim 1 further comprising a second multiplier for biasing the linear regression output.

3. An apparatus for performing regression of multi-variable input data, the apparatus comprising:
- a plurality of multipliers for multiplying each of a plurality of subdivided multi-variable input data with a corresponding weight, respectively, to generate partial multi-variable regression outputs;
- a plurality of Jaber product devices for rearranging the partial multi-variable regression outputs to generate multi-variable regression outputs; and
- a subtractor for subtracting the multi-variable regression outputs from a desired result to generate an error of a multi-variable regression model.

4. The apparatus of claim 3 further comprising a plurality of second multipliers for biasing the multi-variable partial regression outputs.

5. An apparatus for processing input data in parallel, the apparatus comprising:
- a plurality of adaptive filters for processing input data in parallel, each adaptive filter accepting each of a plurality of subdivided input data and generating a partial filtered output;
- a plurality of subtractors, each subtractor for subtracting the partial filtered output from a partial desired output for generating a partial error signal;
- a plurality of feedback networks for adjusting the adaptive filters in accordance with a corresponding partial error signal; and
- a Jaber product device for rearranging partial error signals from the adaptive filters to generate an error output.

6. A method for performing linear regression of input data, the method comprising:
- receiving input data;
- dividing the input data into a plurality of subgroups;
- multiplying each subdivided input data with a corresponding weight, respectively, in parallel, to generate partial linear regression outputs;
- rearranging the partial linear regression outputs to generate a linear regression output; and
- subtracting the linear regression output from a desired result to generate an error of a linear regression model.

7. A method for processing input data in parallel, the method comprising:
- receiving input data;
- dividing the input data into a plurality of subgroups;
- filtering each of the subdivided input data in parallel with a plurality of adaptive filters to generate partial filtered outputs;
- subtracting each of the partial filtered outputs from a desired result to generate partial errors;
- adjusting the adaptive filters in accordance with the partial errors; and
- rearranging the partial errors to generate an error output.

8. An apparatus for performing linear regression of input data, the apparatus comprising:
- a plurality of multipliers for multiplying each of a plurality of subdivided input data picked up at a stride r with corresponding weights, respectively, to generate partial linear regression outputs;
- a plurality of subtractor for subtracting each of the partial linear regression outputs from a partial desired result to generate partial errors; and
- a Jaber product device for rearranging the partial errors and generating an error of a linear regression model.

9. The apparatus of claim 8 further comprising a plurality of second multipliers for biasing the partial linear regression outputs.

10. An apparatus for performing regression of multi-variable input data, the apparatus comprising:
- a plurality of multipliers for multiplying each of a plurality of subdivided multi-variable input data with a corresponding weight, respectively, to generate partial multi-variable regression outputs;
- a plurality of subtractors for subtracting each of the partial multi-variable regression outputs from a partial desired result to generate multi-variable partial errors; and
- a Jaber product device for rearranging the multi-variable partial errors to generate an error of a multi-variable regression model.

11. The apparatus of claim 10 further comprising a plurality of second multipliers for biasing the multi-variable partial regression outputs.

12. A method for performing linear regression of input data, the method comprising:
- receiving input data;
- dividing the input data into a plurality of subgroups;
- multiplying each subdivided input data with a corresponding weight, respectively, in parallel, to generate linear partial regression outputs;
- subtracting each of the linear partial regression outputs from a partial desired result to generate partial errors; and
- rearranging the partial errors to generate an error of a linear regression model.

* * * * *